United States Patent
Li

(10) Patent No.: US 12,056,094 B2
(45) Date of Patent: Aug. 6, 2024

(54) METHOD AND APPARATUS FOR DEPLOYING VIRTUALISED NETWORK FUNCTION

(71) Applicant: HUAWEI TECHNOLOGIES CO., LTD., Guangdong (CN)

(72) Inventor: Shitao Li, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 519 days.

(21) Appl. No.: 17/361,181

(22) Filed: Jun. 28, 2021

(65) Prior Publication Data

US 2021/0326306 A1 Oct. 21, 2021

Related U.S. Application Data

(63) Continuation of application No. PCT/CN2019/128356, filed on Dec. 25, 2019.

(30) Foreign Application Priority Data

Dec. 26, 2018 (CN) .......................... 201811597995.9

(51) Int. Cl.
*G06F 16/00* (2019.01)
*G06F 9/455* (2018.01)
(Continued)

(52) U.S. Cl.
CPC ........ *G06F 16/176* (2019.01); *G06F 9/45558* (2013.01); *G06F 16/13* (2019.01);
(Continued)

(58) Field of Classification Search
CPC ....... G06F 16/176; G06F 16/188; G06F 16/13
(Continued)

(56) References Cited

U.S. PATENT DOCUMENTS

| | | | |
|---|---|---|---|
| 2016/0328259 A1 | 11/2016 | Xia et al. | |
| 2017/0006083 A1* | 1/2017 | McDonnell | ............ H04L 41/12 |
| 2018/0309646 A1* | 10/2018 | Mustafiz | ................. H04L 67/51 |

FOREIGN PATENT DOCUMENTS

| | | |
|---|---|---|
| CN | 105429780 A | 3/2016 |
| CN | 105656646 A | 6/2016 |

(Continued)

OTHER PUBLICATIONS

Draft ETSI GS NFV-SOL 001 V0.13.0(Nov. 2018), Network Functions Virtualisation(NFV) Release 2;Protocols and Data mode Is; NFV descriptors based on TOSCA specification, total 216 pages.

(Continued)

*Primary Examiner* — Chelcie L Daye
(74) *Attorney, Agent, or Firm* — HUAWEI TECHNOLOGIES CO., LTD.

(57) ABSTRACT

In a method of deploying a virtualised network function (VNF), a virtual network function manager (VNFM) obtains a virtualized network function descriptor (VNFD) that includes a primary file and one or more secondary files that have a mapping relationship with the primary file. The primary file includes a deployment parameter of each secondary file, and a association relationship indicating that a value of a flavour parameter of the VNF is associated with the deployment parameter of the secondary file. The VNFM then determines a target file from the one or more secondary files based on the value of the flavour parameter of the VNF and deploy S the VNF based on the association relationship and a mapping relationship between the primary file and the target file.

12 Claims, 8 Drawing Sheets

(51) Int. Cl.
*G06F 16/13* (2019.01)
*G06F 16/176* (2019.01)
*G06F 16/188* (2019.01)

(52) U.S. Cl.
CPC .... *G06F 16/188* (2019.01); *G06F 2009/4557* (2013.01); *G06F 2009/45595* (2013.01)

(58) Field of Classification Search
USPC ........................................................ 707/608
See application file for complete search history.

(56) References Cited

FOREIGN PATENT DOCUMENTS

| CN | 105790976 A | 7/2016 |
|---|---|---|
| CN | 105955824 A | 9/2016 |
| CN | 106161049 A | 11/2016 |
| CN | 107689882 A | 2/2018 |
| WO | 2018033878 A1 | 2/2018 |

OTHER PUBLICATIONS

ETSI GS NFV-IFA 013 V3.1.4(Dec. 2018-12), Network Functions Virtualisation (NFV) Release 3;Management and Orchestration;Os-Ma-Nfvo reference point-Interface and Information Model Specification, total 194 pages.

Sadaf Mustafiz et al.,"A Network Service Design and Deployment Process for NFV Systems",2016 IEEE 15th International Symposium on Network Computing and Applications,total 10 pages.

WG/TG Chairman: "ETSI NFV Concepts and MANO details-NFV#19 Tutorial Presentation", ETSI Draft; NFV(17) 000251R1 European Telecommunications Standards Institute (ETSI), 650, Route Des Lucioles; F-06921 Sophia-Antipolis; France vol. ISG-NFV-Network Functions Virtualisation Sep. 10, 2017 (Sep. 10, 2017), pp. 1-45, XP014299414, total 46 pages.

\* cited by examiner

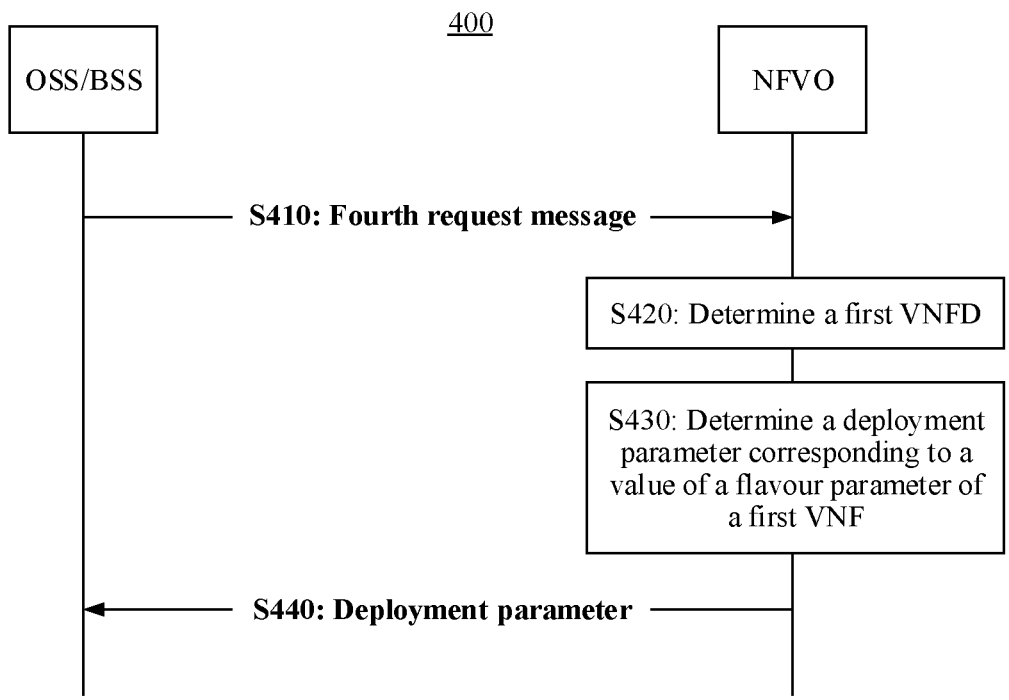

METHOD AND APPARATUS FOR DEPLOYING VIRTUALISED NETWORK FUNCTION

CROSS-REFERENCE TO RELATED APPLICATIONS

This application is a continuation of International Application No. PCT/CN2019/128356, filed on Dec. 25, 2019, which claims priority to Chinese Patent Application No. 201811597995.9, filed on Dec. 26, 2018. The disclosures of the aforementioned applications are hereby incorporated by reference in their entirety.

TECHNICAL FIELD

This application relates to the computer field, and more specifically, to a method and an apparatus for deploying a virtualised network function in the computer field.

BACKGROUND

Network function virtualisation (network function virtualization, NFV) uses general-purpose hardware devices and virtualisation technologies to carry functions of dedicated devices on a conventional network. This may reduce costs of deploying the dedicated devices. Specifically, network function virtualisation can implement resource sharing through cloud computing and can quickly and automatically deploy a new service based on a service requirement. In addition, scaling, fault isolation, and self-healing can be implemented during service deployment.

A virtualised network service (network service, NS) in NFV may be an IP multimedia subsystem (IP multimedia subsystem, IMS) network service network, or may be an evolved packet core (evolved packet core, EPC) network. One NS may include one or more virtualised network function (virtual network function, VNF) modules. During deployment of an NS, a service requester needs to provide descriptor of a network service, also referred to as an NS descriptor (NS descriptor, NSD), to a service provider. The NSD mainly describes a topology structure of the network service and includes descriptor of each VNF (VNF descriptor, VNFD). The VNFD is also referred to as a deployment template of the VNF.

One VNFD includes a plurality of files, including a primary file and one or more secondary files. The primary file is the first file for parsing the VNFD, and mainly includes parameters such as a type (type), properties (properties), and requirements (requirement) of the VNF. Each secondary file indicates a corresponding deployment flavour (deployment flavour) of the VNF. Each secondary file may be used to independently deploy one VNF. During VNF instantiation, a specific secondary file that is to be used to deploy the VNF is determined based on a value of the deployment flavour. However, input parameters required by various secondary files may be different, and how to set an input parameter of each secondary file is a problem to be considered. Currently, a programmer manually inputs an input parameter of a secondary file. In this case, automation is less adequate, and a relatively high requirement is imposed on the programmer. Consequently, human interference is relatively large, and performance of a network service is affected.

SUMMARY

This application provides a method and an apparatus for deploying a virtualised network function, to improve performance of a network service.

According to a first aspect, a method for deploying a VNF is provided, including: A virtualised network function manager VNFM obtains a first VNFD. The first VNFD includes a primary file and one or more secondary files, and there is a mapping relationship between the primary file and each of the one or more secondary files. The primary file includes a deployment parameter of each secondary file and a first association relationship, and the first association relationship is used to indicate that a value of a flavour parameter of a VNF is associated with the deployment parameter of the secondary file.

The VNFM deploys the first VNF based on the first VNFD.

It should be noted that the first VNFD is descriptor of the first VNF.

Therefore, the primary file includes the deployment parameter of each secondary file and the first association relationship, and the first association relationship is used to indicate that the value of the flavour parameter of the VNF is associated with the deployment parameter of the secondary file. When obtaining a value of a flavour parameter of the first VNF, the VNFM may determine, based on the first association relationship, a deployment parameter that is of the secondary file and that is corresponding to the value of the flavour parameter of the first VNF. In this way, a programmer does not need to determine the deployment parameter that is of the secondary file and that is corresponding to the value of the flavour parameter of the first VNF. This reduces participation of the programmer, improves automation, and helps improve system performance.

Optionally, the primary file may determine, based on the mapping relationship, a value of the deployment parameter corresponding to the value of the flavour parameter of the first VNF as a value of the deployment parameter of the secondary file.

Optionally, one value of the flavour parameter of the VNF corresponds to one secondary file.

Specifically, the first association relationship is used to indicate that the value of the flavour parameter of the VNF is associated with the deployment parameter of the secondary file. In other words, if a value of the flavour parameter of the VNF is input, a deployment parameter corresponding to the value of the flavour parameter of the VNF may be obtained based on the first association relationship.

In some implementations, that the VNFM obtains the first VNFD includes: The VNFM receives a first request message. The first request message includes an identifier of the first VNF, the value of the flavour parameter of the first VNF, and the value of the deployment parameter corresponding to the value of the flavour parameter of the first VNF.

The VNFM determines the first VNFD based on the identifier of the first VNF. That the VNFM deploys the first VNF based on the first VNFD:

The VNFM determines a target file from the one or more secondary files based on the value of the flavour parameter of the first VNF.

The VNFM deploys the first VNF based on the first association relationship and a mapping relationship between the primary file and the target file.

Optionally, the first request message may further include an instantiation level, for example, may be a level 1.

In some implementations, that the VNFM deploys the first VNF based on the first association relationship and the mapping relationship between the primary file and the target file includes: The VNFM determines, based on the first association relationship and the value of the flavour parameter of the first VNF, a deployment parameter of the target file from the deployment parameter of each secondary file included in the primary file. The VNFM determines the value of the deployment parameter corresponding to the value of the flavour parameter of the first VNF as a value of the deployment parameter of the target file. The VNFM inputs the value of the deployment parameter of the target file into the target file based on the mapping relationship between the primary file and the target file, and deploys the first VNF based on the value of the deployment parameter of the target file.

In some implementations, before the VNFM receives the first request message, the method further includes: The VNFM receives a second request message sent by a network functions virtualisation orchestrator NFVO, where the second request message is used to request to create the identifier of the first VNF. The VNFM creates the identifier of the first VNF based on the second request message. The VNFM sends the identifier of the first VNF to the NFVO. That the VNFM receives the first request message includes: The VNFM receives the first request message sent by the NFVO.

In some implementations, before the VNFM receives the first request message, the method further includes: The VNFM receives a second request message sent by an operations support system and business support system OSS/BSS, where the second request message is used to request to create the identifier of the first VNF. The VNFM creates the identifier of the first VNF based on the second request message. The VNFM sends the identifier of the first VNF to the OSS/BSS. That the VNFM receives the first request message includes: The VNFM receives the first request message sent by the OSS/BSS through an equipment management system EMS.

In some implementations, before the VNFM determines the first VNFD based on the identifier of the first VNF, the method further includes: The VNFM sends a third request message to the NFVO. The third request message includes the identifier of the first VNF, and the third request message is used to request the first VNFD from the NFVO.

That the VNFM determines the first VNFD based on the identifier of the first VNF includes: The VNFM receives the first VNFD sent by the NFVO based on the third request message.

According to a second aspect, a method for deploying a VNF is provided, including: An operations support system and business support system OSS/BSS sends a fourth request message to a network functions virtualisation orchestrator NFVO. The fourth request message includes an identifier of a first VNFD of a first VNF and a value of a flavour parameter of the first VNF.

The OSS/BSS receives a deployment parameter that is corresponding to the value of the flavour parameter of the first VNF and that is sent by the NFVO. The deployment parameter corresponding to the value of the flavour parameter of the first VNF is determined based on the identifier of the first VNFD and the value of the flavour parameter of the first VNF.

In some implementations, before the OSS/a BSS sends the fourth request message to the network functions virtualisation orchestrator NFVO, the method further includes:

The OSS/BSS sends a fifth request message to the NFVO. The fifth request message includes an identifier of a network service and a value of a flavour parameter of the network service, the network service includes one or more VNFs, and the one or more VNFs include the first VNF.

The OSS/BSS receives a value that is of a flavour parameter of each VNF and that is sent by the NFVO. The value of the flavour parameter of each VNF is determined by the NFVO based on the identifier of the network service and the value of the flavour parameter of the network service.

In some implementations, the method further includes: The OSS/BSS sends a sixth request message to the NFVO. The sixth request message includes an identifier of a second VNFD and a value of a flavour parameter of the second VNF.

The OSS/BSS receives a deployment parameter that is corresponding to the value of the flavour parameter of the second VNF and that is sent by the NFVO. The deployment parameter corresponding to the value of the flavour parameter of the second VNF is determined based on the identifier of the second VNFD and the value of the flavour parameter of the second VNF, and the one or more VNFs include the second VNF.

The OSS/BSS sends a seventh request message to the NFVO. The seventh request message includes the value of the flavour parameter of the network service, a value of the deployment parameter corresponding to the value of the flavour parameter of the first VNF, and a value of the deployment parameter corresponding to the value of the flavour parameter of the second VNF.

In some implementations, after the OSS/BSS sends the fourth request message to the NFVO, the method further includes: The OSS/BSS sends a second request message to a virtualised network function manager VNFMVNFM. The second request message is used to request to create an identifier of the first VNF.

The OSS/BSS receives the identifier of the first VNF sent by the VNFM based on the second request message.

The OSS/BSS sends a first request message to the VNFM through an equipment management system EMS. The first request message includes the identifier of the first VNF, the value of the flavour parameter of the first VNF, and the value of the deployment parameter corresponding to the value of the flavour parameter of the first VNF.

According to a third aspect, a method for deploying a VNF is provided, including: A network functions virtualisation orchestrator NFVO receives a fourth request message sent by an operations support system and business support system OSS/BSS. The fourth request message includes an identifier of a first VNFD of a first VNF and a value of a flavour parameter of the first VNF.

The NFVO determines the first VNFD based on the identifier of the first VNFD.

The NFVO determines, from the first VNFD and based on the value of the flavour parameter of the first VNF, a deployment parameter corresponding to the value of the flavour parameter of the first VNF.

The NFVO sends, to the OSS/BSS, the deployment parameter corresponding to the value of the flavour parameter of the first VNF.

Optionally, because a primary file includes a deployment parameter of each secondary file, the deployment parameter corresponding to the value of the flavour parameter of the first VNF may be determined based on the value of the flavour parameter of the first VNF and a first association relationship.

Optionally, there is a mapping relationship between the primary file and each of the one or more secondary files.

In some implementations, the first VNFD includes a primary file and one or more secondary files. The primary file includes a deployment parameter of each secondary file and a first association relationship. The first association relationship is used to indicate that a value of a flavour parameter of a VNF is associated with the deployment parameter of the secondary file.

That the NFVO determines, from the first VNFD and based on the value of the flavour parameter of the first VNF, the deployment parameter corresponding to the value of the flavour parameter of the first VNF includes:

The NFVO determines, from the primary file and based on the value of the flavour parameter of the first VNF and the first association relationship, the deployment parameter corresponding to the value of the flavour parameter of the first VNF.

In some implementations, before the NFVO receives the fourth request message sent by the OSS/BSS, the method further includes:

The NFVO receives a fifth request message sent by the OSS/BSS. The fifth request message includes an identifier of a network service and a value of a flavour parameter of the network service, the network service includes one or more VNFs, and the one or more VNFs include the first VNF.

The NFVO determines the network service based on the identifier of the network service, where the network service includes a primary file and one or more secondary files.

The NFVO determines, based on the value of the flavour parameter of the network service, a target file of the network service from the one or more secondary files included in the network service.

The NFVO determines, from the target file of the network service, a value of a flavour parameter corresponding to each of the one or more VNFs.

The NFVO sends the value of the flavour parameter corresponding to each VNF to the OSS/BSS.

In some implementations, after the NFVO sends, to the OSS/BSS, the deployment parameter corresponding to the value of the flavour parameter of the first VNF, the method further includes:

The NFVO receives a sixth request message sent by the OSS/BSS, where the sixth request message includes an identifier of a second VNFD and a value of a flavour parameter of the second VNF.

The NFVO determines a template of the second VNF based on the identifier of the second VNFD. The second VNFD includes a primary file and one or more secondary files, the primary file includes a deployment parameter of each secondary file and a second association relationship, and the second association relationship is used to indicate that a value of a flavour parameter of a VNF is associated with the deployment parameter of the secondary file.

The NFVO determines, from the primary file of the second VNFD and based on the value of the flavour parameter of the second VNF and the second association relationship, a deployment parameter corresponding to the value of the flavour parameter of the second VNF.

The NFVO sends, to the OSS/BSS, the deployment parameter corresponding to the value of the flavour parameter of the second VNF.

The NFVO receives a seventh request message sent by the OSS/BSS. The seventh request message includes the value of the flavour parameter of the network service, a value of the deployment parameter corresponding to the value of the flavour parameter of the first VNF, and a value of the deployment parameter corresponding to the value of the flavour parameter of the second VNF.

In some implementations, after the NFVO receives the seventh request message sent by the OSS/BSS, the method further includes:

The NFVO sends a second request message to the VNFM, where the second request message is used to request an identifier of the first VNF.

The NFVO receives the identifier of the first VNF sent by the VNFM based on the second request message.

The NFVO sends a first request message to the VNFN, where the first request message includes the identifier of the first VNF, the value of the flavour parameter of the first VNF, and the value of the deployment parameter corresponding to the value of the flavour parameter of the first VNF.

According to a fourth aspect, an apparatus for deploying a virtualised network function is provided, and is configured to perform the method in any one of the first aspect or the possible implementations of the first aspect. Specifically, the apparatus includes units configured to perform the method in any one of the first aspect or the possible implementations of the first aspect.

According to a fifth aspect, an apparatus for deploying a virtualised network function is provided, and is configured to perform the method in any one of the second aspect or the possible implementations of the second aspect. Specifically, the apparatus includes units configured to perform the method in any one of the second aspect or the possible implementations of the second aspect.

According to a sixth aspect, an apparatus for deploying a virtualised network function is provided, and is configured to perform the method in any one of the third aspect or the possible implementations of the third aspect. Specifically, the apparatus includes units configured to perform the method in any one of the third aspect or the possible implementations of the third aspect.

According to a seventh aspect, this application provides a computer-readable storage medium. The computer-readable storage medium stores computer instructions, and when the computer instructions are run on a computer, the computer is enabled to perform the method in any one of the first aspect or the possible implementations of the first aspect.

According to an eighth aspect, this application provides a computer-readable storage medium. The computer-readable storage medium stores computer instructions, and when the computer instructions are run on a computer, the computer is enabled to perform the method in any one of the second aspect or the possible implementations of the second aspect.

According to a ninth aspect, this application provides a computer-readable storage medium. The computer-readable storage medium stores computer instructions, and when the computer instructions are run on a computer, the computer is enabled to perform the method in any one of the third aspect or the possible implementations of the third aspect.

According to a tenth aspect, this application provides a chip, including a memory and a processor. The memory is configured to store a computer program, and the processor is configured to invoke the computer program from the memory and run the computer program, so that a network device in which the chip is installed performs the method in any one of the first aspect or the possible implementations of the first aspect.

According to an eleventh aspect, this application provides a chip, including a memory and a processor. The memory is configured to store a computer program, and the processor is configured to invoke the computer program from the memory and run the computer program, so that a network device in which the chip is installed performs the method in any one of the second aspect or the possible implementations of the second aspect.

According to a twelfth aspect, this application provides a chip, including a memory and a processor. The memory is configured to store a computer program, and the processor is configured to invoke the computer program from the memory and run the computer program, so that a network device in which the chip is installed performs the method in any one of the third aspect or the possible implementations of the third aspect.

According to a thirteenth aspect, this application provides a computer program product. The computer program product includes computer program code. When the computer program code is run on a computer, the computer is enabled to perform the method in any one of the first aspect or the possible implementations of the first aspect.

According to a fourteenth aspect, this application provides a computer program product. The computer program product includes computer program code. When the computer program code is run on a computer, the computer is enabled to perform the method in any one of the second aspect or the possible implementations of the second aspect.

According to a fifteenth aspect, this application provides a computer program product. The computer program product includes computer program code. When the computer program code is run on a computer, the computer is enabled to perform the method in any one of the third aspect or the possible implementations of the third aspect.

According to a sixteenth aspect, this application provides an apparatus for deploying a virtualised network function, including a transceiver, a processor, and a memory. The processor is configured to control the transceiver to send and receive a signal. The memory is configured to store a computer program, and the processor is configured to invoke the computer program stored in the memory and run the computer program, so that a network device performs the method in any one of the first aspect or the possible implementations of the first aspect.

According to a seventeenth aspect, this application provides an apparatus for deploying a virtualised network function, including a transceiver, a processor, and a memory. The processor is configured to control the transceiver to send and receive a signal. The memory is configured to store a computer program, and the processor is configured to invoke the computer program stored in the memory and run the computer program, so that a network device performs the method in any one of the second aspect or the possible implementations of the second aspect.

According to an eighteenth aspect, this application provides an apparatus for deploying a virtualised network function, including a transceiver, a processor, and a memory. The processor is configured to control the transceiver to send and receive a signal. The memory is configured to store a computer program, and the processor is configured to invoke the computer program stored in the memory and run the computer program, so that a network device performs the method in any one of the third aspect or the possible implementations of the third aspect.

According to a nineteenth aspect, this application provides a system for deploying a virtualised network function. The system includes the apparatus in any one of the first aspect or the possible implementations of the first aspect, the apparatus in any one of the second aspect or the possible implementations of the second aspect, and the apparatus in any one of the third aspect or the possible implementations of the third aspect.

Alternatively, the system includes the apparatus in any one of the sixteenth aspect or the possible implementations of the sixteenth aspect, the apparatus in any one of the seventeenth aspect or the possible implementations of the seventeenth aspect, and the apparatus in any one of the eighteenth aspect or the possible implementations of the eighteenth aspect.

BRIEF DESCRIPTION OF DRAWINGS

FIG. 3 is a schematic flowchart of a method for deploying a virtualised network function according to an embodiment of this application;

FIG. 4 is a schematic flowchart of another method for deploying a virtualised network function according to an embodiment of this application;

DESCRIPTION OF EMBODIMENTS

The following describes technical solutions in this application with reference to the accompanying drawings.

Figure 1:
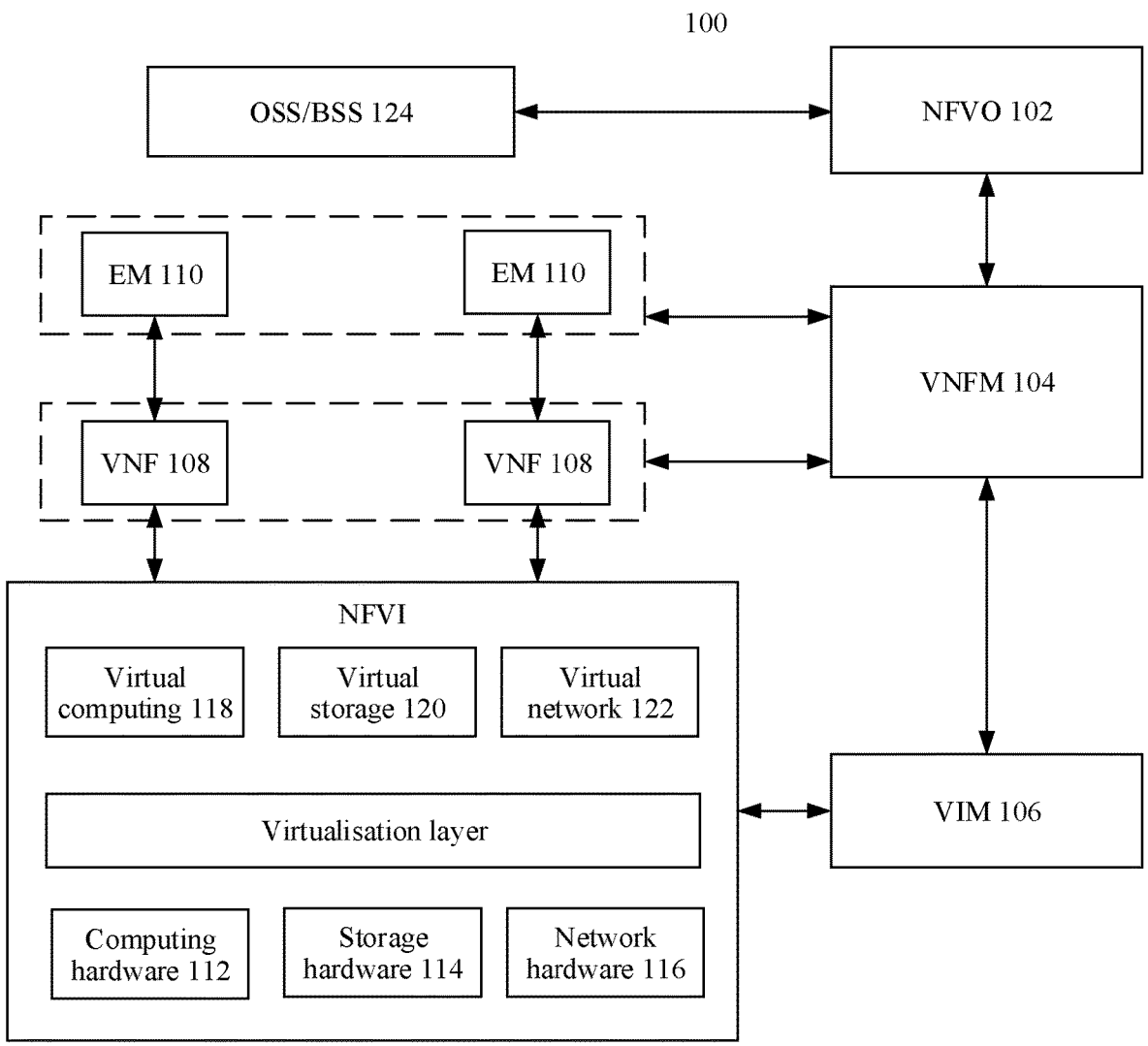
FIG. 1 is a schematic architectural diagram of a system to which an embodiment of this application is applied.

FIG. 1 is a schematic architectural diagram of an NFV system, including a network functions virtualisation orchestrator (network function virtualisation orchestration, NFVO) 102, a virtualised network function manager (virtualised network function manager, VNFM) 104, and an operations support system and business support system (operations support system and business support system, OSS/BSS) 124. Optionally, the system further includes at least one of a virtualised infrastructure manager (virtualized infrastructure manager, VIM) 106, a network functions virtualisation infrastructure (network functions virtualization infrastructure, NFVI), and an element management (element management, EM) 110.

The NFVO 102 is mainly responsible for lifecycle management of a virtualisation service, allocation and scheduling of virtual resources at a network functions virtualisation infrastructure (NFV infrastructure, VFVI) layer, and the like. The NFVO 102 may communicate with one or more VNFMs 104, to execute a resource-related request, send configuration information to the VNFM 104, and collect status information of a VNF 108. In addition, the NFVO 102 may also communicate with the VIM 106, perform resource allocation and/or reservation, and exchange virtualised hardware resource configuration and status information.

The VNFM 104 is responsible for lifecycle management of one or more VNFs 108, for example, instantiating (instantiating), updating (updating), querying, scaling (scaling), or terminating (terminating) the VNF 108. The VNFM 104 may communicate with the VNF 108, to complete VNF lifecycle management and exchange configuration and status information with the VNF 108. There may be a plurality of VNFMs 104 in an NFV architecture, and are responsible for performing lifecycle management on different types of VNFs.

The VIM 106 controls and manages interaction between the VNF 108 and each of computing hardware 112, storage hardware 114, network hardware 116, virtual computing (virtual computing) 118, virtual storage 120, and a virtual network 122. For example, the VIM 106 executes a resource management function, which includes infrastructure resource management, allocation (for example, adding a resource to a virtual container), and a running function (for example, collecting fault information of the NFVI). The VNFM 104 and the VIM 106 may communicate with each other, to request resource allocation and exchange virtualised hardware resource configuration and status information.

The network functions virtualisation infrastructure (network functions virtualization infrastructure, NFVI) is an infrastructure layer of the NFV, including a hardware component, a software component, or a combination of both, to establish a virtualisation environment, and deploy, manage, and implement the VNF 108. A hardware resource and a virtualisation layer are used to provide virtualised resources such as a virtual machine and a virtual container in another form for the VNF 108. The hardware resource includes the computing (computing) hardware 112, the storage hardware 114, and the network hardware 116. In an implementation, resources of the computing hardware 112 and the storage hardware 114 may be centralized. The virtualisation layer in the NFVI may abstract the hardware resource, and decouple the VNF 108 from an underlying physical network layer.

The EM 110 is a system for configuring and managing a device in a conventional telecommunications system. In the NFV architecture, the EM 110 may also be used for configuring and managing the VNF, and initiating a lifecycle management operation to the VNFM, for example, instantiating a new VNF.

The OSS/BSS 124 supports various end-to-end telecommunication services. Management functions supported by the OSS include network configuration, service provision, fault management, and the like. The BSS processes an order, payment, income, or the like, and supports product management, order management, revenue management, and customer management.

In the embodiments of this application, an example in which the NFV is a VNFD model based on a TOSCA language is used for description. However, the embodiments of this application are not limited thereto, and may alternatively be a VNFD model in another language.

To facilitate understanding of this application, before a method for deploying a virtualised network function provided in this application is described, concepts in this application are first briefly described.

VNFD: A VNFD includes a plurality of TOSCA service templates (service template), including one top level service template (top level service template) and one or more low level service templates (low level service template). The top level service template is the first file for parsing the VNFD and is also referred to as a primary file, and mainly includes descriptions of node_template of the VNF. The VNF node template includes parameters such as type, properties, and requirements of the VNF, as described in the following. The low level service template may include a plurality of TOSCA service templates, which are also referred to as secondary files. Each low level service template represents a deployment flavour (deployment flavour) of a VNF. Each low level service template may be independently deployed. During VNF instantiation, a specific low level service template to be deployed is determined based on a value of flavour_id in an instantiation request. Different deployment flavours correspond to different resource requirements during VNF deployment. Therefore, compositions of service templates corresponding to the different deployment flavours may be different. For example, a flavour described in VNF_DF2.yaml in the foregoing example may be specific to a scenario of a large quantity of user access. In this case, two VDU resources: VDU_1 and VDU_2 are required to provide services. VNF_DF1.yaml describes a scenario of a small quantity of user access. In this case, only one VDU_1 needs to be deployed to provide services. Each low level service template is associated with the top level service template through substitution_mapping. Specifically, the low level service template is associated with the top level service template by defining a type and a value of flavour_id in properties in substitution_mapping. For example, when a deployment flavour indicated in a VNF instantiation request is flavour 1, a VNF 1 node template in the top level service template has flavour_id: get_input (flavour), indicating obtaining a value of a flavour, namely, flavour 1, from the request. In this case, the top level service template is associated with VNF_DF1.yaml in the low-level service template through type: tosca.nodes.nfv.exampleVNF and flavour_id: flavour 1. In other words, a VNF (specifically, including resources such as a VDU, a VL, and a CP that are to be included in the service template) of the deployment flavour is deployed through the VNF_DF1.yaml.

For example, descriptions of the top level service template (top level service template) are provided as follows, for example, including descriptions of VNFD.yaml.

```
tosca_definitions_version: tosca_simple_yaml_1_2
topology_template:
   inputs:
      flavour;
         type: string
         required:true
node_templates:
      VNF1:
         type: tosca.nodes.nfv.exampleVNF
         properties:
            flavour_id: get_input(flavour)
         ...
         requirements:
            -virtual_link
```

Descriptions of the two low level service templates (low level service template), are provided as follows, for example, including descriptions of VNF_DF1.yaml and VNF_DF2.yaml.

```
Descriptions of VNF_DF1.yaml:
tosca_definitions_version: tosca_simple_yaml_1_2
imports:
topology_template:
   inputs:
      private_net_id:
      type: string
      private_net_cidr
      type: string
   substitution mapping
      node_type: tosca.nodes.nfv.exampleVNF
properties:
      flavour_id: flavour 1
```

-continued

```
node_templates:
  exampleVNF:
    type: tosca.nodes.nfv.exampleVNF
    VDU_1:
    CP_1
    VL_1:
      Properties:
        vl_profile:
          networkname:{get_input: private_net_id}
          cidr:{get_input: private_net_cidr}
Descriptions of VNF_DF2.yaml:
tosca_definitions_version: tosca_simple_yaml_1_2
imports:
topology_template:
  inputs:
    private_net_id:
      type: string
    private_net_cidr
      type: string
    vgw_private_ip_1
      type: string
  substitution mapping
    node_type:
      tosca.nodes.nfv.exampleVNF
    properties:
      flavour_id: flavour 2
  node_templates:
    exampleVNF:
      type: tosca.nodes.nfv.exampleVNF
      VDU_1:
      VDU_2:
      CP_1:
        properties:
          fixed_ip_address: {get_input: vgw_private_ip_1}
      VL_1:
        properties:
          vl_profile: networkname: {get_input: private_net_id}
          cidr: {get_input: private_net_cidr}
```

It can be learned from the foregoing VNF_DF1.yaml and VNF_DF2.yaml that, input parameters required for instantiating each low level service template may be different. For example, input parameters defined in VNF_DF1.yaml are as follows:

private_net_id:
  type: string
private_net_cidr:
  type: string

Input parameters defined in VNF_DF2.yaml are as follows:

private_net_id:
  type: string
private_net_cidr:
  type: string
vgw_private_ip_1
  type: string Values of parameters of different low level service templates need to be carried in an instantiation request of a requester, but different input parameters are required for different low level service templates. In the current technology, a programmer needs to have a judgment capability, to send the values of the input parameters to a provider through the instantiation request based on the programmer's understanding of the low level service templates. For example, if a current value of the flavour parameter is flavour 1, the programmer needs to know that the input parameter defined in VNF_DF1.yaml is as follows:

private_net_id:
  type: string
private_net_cidr:
  type: string

Then the programmer assigns values to these parameters and sends the values to the provider through the instantiation request. Assuming that the programmer's cognitive ability is inadequate, and a current value of the flavour parameter is flavour 2, the following parameters may be provided to the provider:

private_net_id:
  type: string
private_net_cidr:
  type: string

Figure 2:
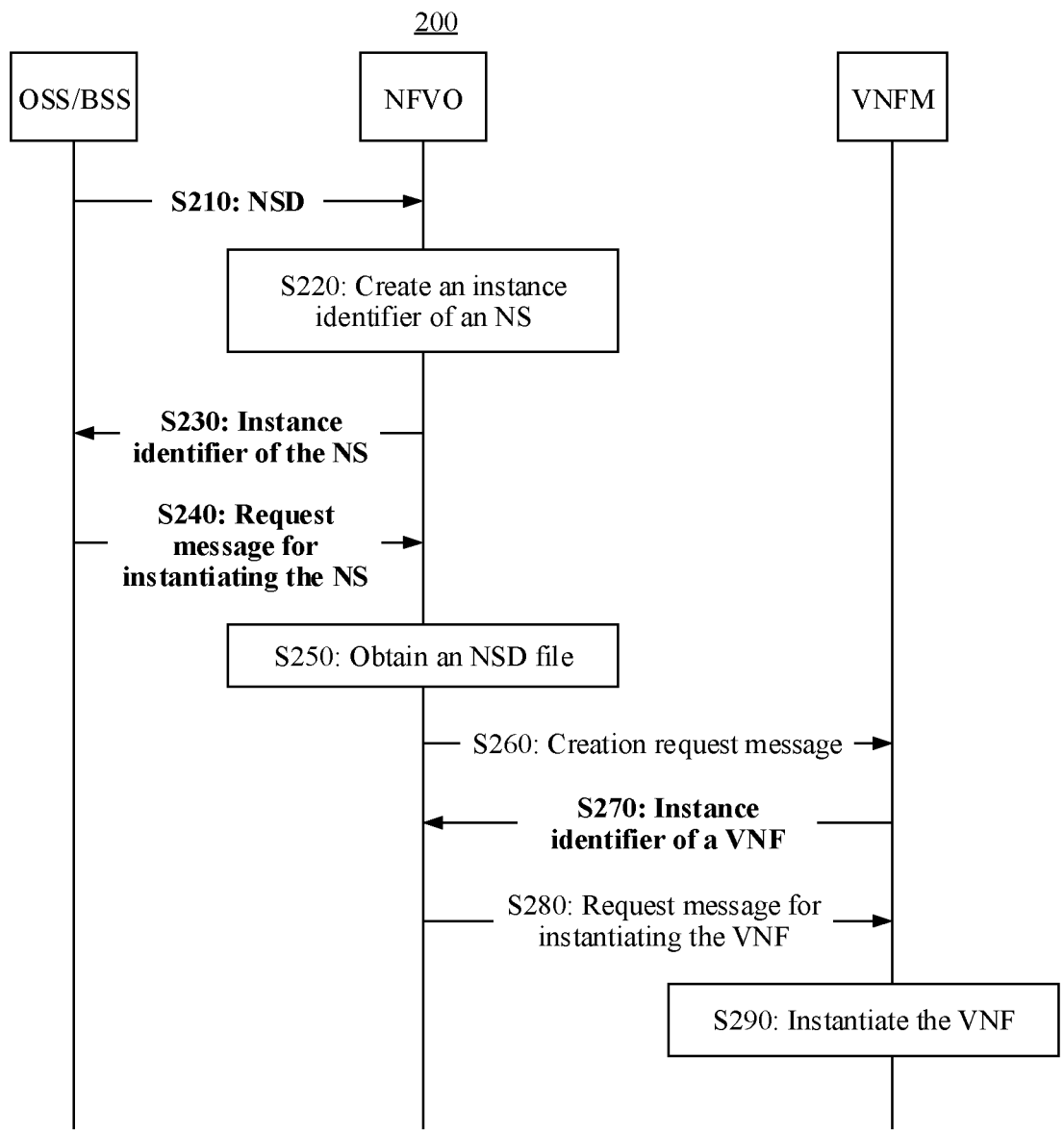
FIG. 2 is a schematic flowchart of an existing method for deploying a virtualised network function.

However, input parameters of VNF_DF2.yaml corresponding to flavour 2 are as follows:

private_net_id:
  type: string
private_net_cidr:
  type: string
vgw_private_ip_1
  type: string For example, the following describes an existing method 200 for deploying a VNF with reference to FIG. 2, and the method includes the following steps.

S210: An OSS/BSS sends an NSD to an NFVO, so that the NSD is stored in the NFVO or a database that can be accessed by the NFVO.

S220: The NFVO creates an instance identifier of an NS based on the NSD uploaded by the OSS/BSS.

It should be noted that one NSD may include a plurality of service templates. For example, the NSD may include one top level service template (top level service template) and one or more low level service templates (low level service template). The top level service template is also referred to as a primary file, and the low level service template may also be referred to as a secondary file. For example, in the following description, the NSD includes NSD.yaml (primary file), NS-DF1.yaml (secondary file), and NS_DF2.yaml (secondary file). A deployment file corresponding to a flavour parameter flavour 1 is NS-DF1.yaml, and a deployment file corresponding to a flavour parameter flavour 2 is NS_DF2.yaml.

```
NSD.yaml is described as follows:
tosca_definitions_version: tosca_simple_yaml_1_2
imports:
  - SOL001types
  - exampleVNF.yaml
  - NS_DF1.yaml
  - NS_F2.yaml
topology_template:
  inputs:
    flavour:
      type: string
      required:true
    node_templates:
      NS_1:
        type:tosca.nodes.nfv.exampleNS
        properties:
          flavour_id: get_input (flavour)
        ...
        requirements:
          -virtual_link
        interface:
NS-DF1.yaml is described as follows:
tosca_definitions_version:tosca_simple_yaml_1_2
imports:
topology template:
  substitution_mapping
    node_type: tosca.nodes.nfv.exampleNS
    properties:
      flavour_id:flavour 1
    requirements:
      virtual_link: [VNF_1, virtual_link]
```

```
   node_templates:
     NS_1:
       type: tosca.nodes.nfv.exampleNS
       interface:
     VNF_1:
       type: tosca.nodes.nfv.exampleVNF
       properties
         provider:
           vnf_profile:
             flavour_id: flavour 1
             instantiation level: level_1
     VNF_2:
     VL_1:
NS_DF2.yaml is described as follows:
tosca_definitions_version:tosca_simple_yaml_1_2
imports:
topology template:
substitution mapping
  node_type: tosca.nodes.nfv.exampleNS
    properties:
      flavour_id: flavour 2
    requirements:
      -virtual_link: [VNF_1,virtual_link]
  node_templates:
    NS_1:
      type:tosca.nodes.nfv. exampleNS
      interface:
    VNF_1:
      type: tosca. nodes. nfv. exampleVNF
      properties
        provider:
          vnf_profile:
            flavour_id: flavour 2
            instantiation level: level_2
    VNF_2:
    VNF_3:
    VL_1:
```

S230: The NFVO sends the instance identifier of the created NS to the OSS/BSS.

S240: The OSS/BSS sends, to the NFVO, a request message for instantiating the NS, where the request message carries the instance identifier of the NS, a value of a flavour parameter (flavour) of the NS, and a value of a deployment parameter of a VNF included in the NS.

The NFVO determines, based on the value of the flavour parameter of the NS, to use which secondary file to deploy the NS. Assuming that the value of the flavour parameter of the NS is flavour 1, the NFVO determines to use NS_DF1.yaml to deploy the NS.

The secondary file describes resource information such as a VNF and a virtual link (virtual link, VL) included in a corresponding deployment flavour (deployment flavour) of the NS. The resource information of the VNF includes deployment flavour (deployment flavour) information existing during VNF deployment, for example, flavour_id: flavour 1 information in properties of a VNF_1.

When a professional programmer learns that the value of the flavour parameter of the NS is flavour 1, the programmer further needs to know deployment parameters corresponding to the value (flavour 1) of the flavour parameter of the VNF_1 in a NS_DF 1, assigns values to these deployment parameters, and sends the request message, in S240, including the parameters to the NFVO. For example, the deployment parameters of the VNF_1 are private_net_id and private_net_cidr, and the programmer needs to assign values to the two parameters. In this case, a higher requirement is imposed on the programmer, that is, the programmer needs to be familiar with the NSD, VNFs that need to be deployed and that are included in a secondary file of each NSD, and a deployment parameter of each VNF.

S250: The NFVO obtains an NSD file based on the instance identifier of the NS. For example, the NSD file may alternatively be described based on a TOSCA language, and VNFD information included in the NSD is obtained from the NSD.

For example, template information of the VNF 1 in the NS_DF1 is as follows:

```
VNF_1:
  type: tosca.nodes.nfv.exampleVNF
  properties
    provider:
      vnf_profile:
        flavour_id: flavour 1
        instantiation_level: level_1
```

S260: Before sending a request for instantiating a VNF, the NFVO sends a creation request message to a VNFM, where the creation request message is used to request to create an instance identifier of the VNF.

S270: The VNFM creates the instance identifier of the VNF based on the request message, and returns the created instance identifier of the VNF to the NFVO.

S280: The NFVO sends the request message for instantiating the VNF to the VNFM. The request message for instantiating the VNF includes the instance identifier of the VNF obtained in S270, the deployment flavour identifier (flavour_id) for deploying the VNF that is included in NS_DF1.yaml, and information such as the value of the deployment parameter of the VNF included in the NS in S240.

S290: The VNFM instantiates the VNF based on the parameter carried in the request for instantiating the VNF.

It should be noted that a secondary file of an NS includes one or more VNFDs. It is assumed that a secondary file of an NS includes a plurality of VNFDs, S260 to S280 are performed once for each VNFD, and S260 to S280 are performed for a plurality of times for a plurality of VNFDs. In this way, NS deployment is completed.

It can be learned from the foregoing description that this manner encounters relatively large human interference, and causes a deviation of an input parameter provided by a demander, and even causes a failure of an entire instantiation process, thereby affecting system performance. In addition, this manner requires high labor costs. Therefore, in this case, a method for reducing dependence on the programmer is required, and it is expected that the deployment parameter of each VNF can be automatically identified. In this embodiment of this application, a method for deploying a VNF is provided, to reduce human interference, and help improve system performance.

The following describes, with reference to the accompanying drawings, the method for deploying a VNF provided in the embodiments of this application.

FIG. 3 describes a method 300 for deploying a VNF according to an embodiment of this application. The method 300 includes the following steps.

S310: A VNFM obtains a first VNFD of a first VNF, where the first VNFD includes a primary file and one or more secondary files, there is a mapping relationship between the primary file and each of the one or more secondary files, the primary file includes a deployment parameter of each secondary file and a first association relationship, and the first association relationship is used to indicate that a value of a flavour parameter of a VNF is associated with the deployment parameter of the secondary file.

For example, the primary file may be the foregoing top level service template (top level service template), and the secondary file may be the foregoing low level service template (low level service template). For example, the first VNFD may include a top level service template and one or more low level service templates, for example, may include VNFD.yaml, VNF_DF1.yaml, and VNF_DF2.yaml that are described below.

It should be understood that there is a mapping relationship between the primary file and each of the one or more secondary files. It may be understood that the primary file may determine, based on the mapping relationship, a value of a deployment parameter corresponding to a value of a flavour parameter of the first VNF as a value of the deployment parameter of the secondary file. For example, the mapping relationship may be a relationship between the primary file and the secondary file.

S320: The VNFM deploys the first VNF based on the first VNFD.

Therefore, according to the method for deploying a VNF provided in this embodiment of this application, the primary file includes the deployment parameter of each secondary file and the first association relationship, and the first association relationship is used to indicate that the value of the flavour parameter of the VNF is associated with the deployment parameter of the secondary file. When obtaining the value of the flavour parameter of the first VNF, the virtualised network function manager may determine, based on the first association relationship, a deployment parameter that is of the secondary file and that is corresponding to the value of the flavour parameter of the first VNF. In this way, a programmer does not need to determine the deployment parameter that is of the secondary file and that is corresponding to the value of the flavour parameter of the first VNF. This reduces participation of the programmer, improves automation, and helps improve system performance.

In an optional embodiment, S310 includes: receiving, by the VNFM, a first request message, where the first request message includes an identifier of the first VNF, the value of the flavour parameter of the first VNF, and the value of the deployment parameter corresponding to the value of the flavour parameter of the first VNF; and determining, by the VNFM, the first VNFD based on the identifier of the first VNF.

S320 includes: determining, by the VNFM, a target file from the one or more secondary files based on the value of the flavour parameter of the first VNF; and deploying, by the VNFM, the first VNF based on the first association relationship and a mapping relationship between the primary file and the target file.

Optionally, the first request message may further include an instantiation level, for example, may be a level 1.

In an optional embodiment, before the determining, by the VNFM, the first VNFD based on the identifier of the first VNF, the method further includes:

sending, by the VNFM, a third request message to an NFVO, where the third request message includes the identifier of the first VNF, and the third request message is used to request the first VNFD from the NFVO.

The determining, by the VNFM, the first VNFD based on the identifier of the first VNF includes: receiving, by the VNFM, the first VNFD sent by the NFVO based on the third request message.

Specifically, the first VNFD may be stored in the NFVO. When the VNFM needs to deploy the first VNF, the VNFM requests the first VNFD from the NFVO based on the identifier of the first VNF.

In an optional embodiment, the deploying, by the VNFM, the first VNF based on the first association relationship and a mapping relationship between the primary file and the target file includes:

determining, by the VNFM based on the first association relationship and the value of the flavour parameter of the first VNF, a deployment parameter of the target file from the deployment parameter of each secondary file included in the primary file;

determining, by the VNFM, the value of the deployment parameter corresponding to the value of the flavour parameter of the first VNF as a value of the deployment parameter of the target file; and inputting, by the VNFM, the value of the deployment parameter of the target file into the target file based on the mapping relationship between the primary file and the target file, and deploying the first VNF based on the value of the deployment parameter of the target file.

Optionally, an identifier of a VNF may also be referred to as an instance identifier of the VNF.

Specifically, the identifier of each VNF is in a one-to-one correspondence with each VNFD. First, after obtaining the identifier of the first VNF, the VNFM may determine the first VNFD based on the identifier of the first VNF. For example, the VNFM requests the first VNFD from the NFVO based on the identifier of the first VNF. In this way, the VNFM may deploy the first VNF based on the first VNFD. A value of one flavour parameter corresponds to one secondary file. Then, when the value of the flavour parameter of the first VNF is obtained, a secondary file corresponding to the value of the flavour parameter of the first VNF may be determined from the one or more secondary files as the target file. For example, in the foregoing description, when the value of the flavour parameter of the first VNF is flavour 1, it may be determined that the target file is VNF_DF1.yaml. Further, after the value of the flavour parameter of the first VNF is obtained, the association relationship between the value of the flavour parameter of the VNF and the deployment parameter of the secondary file exists in the primary file. The VNFM may determine the deployment parameter of the target file based on the value of a first flavour parameter. In this way, it may be determined that the value that is of the deployment parameter corresponding to the flavour parameter of the first VNF and that is carried in the first request message is the value of the deployment parameter of the target file. Finally, the value of the deployment parameter of the target file may be input into the target file based on the mapping relationship between the primary file and the target file, and the VNFM deploys the first VNF based on the target file.

The following uses an example for description. An example in which an NFV is a VNFD model based on a TOSCA language is still used for description. However, this embodiment of this application is not limited thereto, and the NFV may alternatively be a VNFD model in another language.

For example, the following provides descriptions of the primary file, for example, the primary file is VNFD.yaml.

--- tosca_definitions_version: tosca_simple_yaml_1_2
inputs:
- SOL001types
- exampleVNF.yaml
- VNF_DF1.yaml

```
    - VNF_DF2.yaml
data_types:
  inst_info_flavour 1:#deployment parameters used for flavour 1
    private_net_id:
      type: string
    private_net_cidr:
      type: string
  inst_info_flavour 2#deployment parameters used for flavour 2
    private_net_id:
      type: string
    private_net_cidr:
      type: string
    vgw_private_ip_1
      type: string
topology template:
  inputs
    flavour;
      type: string
      required: true
    additional_parameters:
      type: concat: ['inst_info_', get_input (flavour)]
      required: false
node_templates:
  VNF1:
    type: tosca.nodes.nfv.exampleVNF
    properties:
      flavour_id: get_input (flavour)
      instantiate_input: get_input (additional_parameters)
    requirements:
      -virtual_ink
VNF_DF1.yaml is described as follows:
tosca_definitions_version: tosca_simple_yaml_1_2
imports:
  data_types:
    inputs_data:
      private_net_id:
        type: string
      private_net_cidr:
        type: string
topology_template:
  inputs:
    instantiate input:
      type: inputs_data
    substitution mapping
      node_type: tosca.nodes.nfv.exampleVNF
      properties:
        flavour_id: flavour 1
  node_templates:
    VNF1:
      type: tosca.nodes.nfv.exampleVNF
      interface:
      VDU_1:
      VDU_2:
      CP_1:
      VL_1:
        properties:
          vl_profile:
          networkname: {get_input: instantiate_input, private_net_id}
          cidr: {get_input: instantiate_input, private_net_cidr}
Descriptions of VNF_DF2.yaml:
tosca_definitions_version: tosca_simple_yaml_1_2
imports:
data_types:
  inputs_data:
    private_net_id:
      type: string
    private_net_cidr:
      type: string
    vgw_private_ip_1
      type: string
topology_template:
  inputs:
    instantiate_input:
      type: inputs_data
    substitution mapping
      node_type: tosca.nodes.nfv.exampleVNF
      properties:
        flavour_id: flavour 2
      requirements:
```

```
      -virtual_link: [CP_1, virtual_link]
   node_templates:
     VNF1:
       type: tosca.nodes.nfv.exampleVNF
       VDU_1:
       VDU_2:
       CP_1:
         properties:
           fixed_ip_address: {get_input: instantiate_input : vgw_private_ip_1}
       VL_1:
         properties:
           vl_profile:
             networkname: {get_input: instantiate_input: private_net_id}
             cidr: {get_input: instantiate_input : private_net_cidr}
```

The secondary file may be, for example, VNF_DF1.yaml and VNF_DF2.yaml:

With reference to the descriptions of the primary file and the secondary file in the foregoing example, it is assumed that the first request message carries VNF1_id (which is the identifier of the first VNF, and may also be referred to as an instance identifier of the first VNF), flavour 1 (the value of the flavour parameter of the first VNF), private_net_id: net1234567 (the value of the deployment parameter corresponding to the value of the flavour parameter of the first VNF), and private_net_cidr: 192.168.0.0/24 (the value of the deployment parameter corresponding to the value of the flavour parameter of the first VNF). The VNFM sends the third request message to the NFVO, where the third request message carries the VNF1_id. The NFVO determines a VNFD 1 based on the VNF1_id in the third request message, and sends the VNFD 1 to the VNFM. For example, the VNFD 1 includes VNFD.yaml, VNF_DF1.yaml, and VNF_DF2.yaml. A secondary file corresponding to flavour 1 is VNF_DF1.yaml, and a secondary file corresponding to flavour 2 is VNF_DF2.yaml. The VNFM determines that the target file is VNF_DF1.yaml based on flavour 1. When the VNFM learns that the value of the flavour parameter of the first VNF is flavour 1, the VNFM associates flavour 1 with private_net_id: type: string private_net_cidr: type: string. It is indicated that flavour 1 in VNFD.yaml is associated with the deployment parameters of VNF_DF1.yaml, for example, indicated by type: concat:['inst_info_', get_input (flavour)] in VNFD.yaml. In this way, the VNFM can determine that values that are carried in the first request message and that are of the deployment parameters corresponding to the value of the flavour parameter of the first VNF is values of private_net_id and private_net_cidr, and then set private_net_id: net1234567 and private_net_cidr: 192.168.0.0/24 to values of the deployment parameters of VNF_DF1.yaml. Instantiate_input: get_input (additional_parameters) in the VNFD.yaml file may be referred to as the mapping relationship between the primary file and the target file. The VNFM may input private_net_id: net1234567 and private_net_cidr: 192.168.0.0/24 into VNF_DF1.yaml based on instantiate_input: get_input (additional_parameters), and use VNF_DF1.yaml file to deploy the first VNF. For example, if one NSD includes two VNFDs during NS deployment, the procedure needs to be executed more than twice.

The following describes, in two aspects, that the VNFM receives a second request message, where the second request message is used to request to create the identifier of the first VNF. A first aspect describes a case in which the VNFM receives the second request message from the NFVO, and a second aspect describes a case in which the VNFM receives the second request message from an OSS/BSS. When one NS needs to be deployed, in the first aspect, because one NSD includes one or more VNFDs, the NFVO needs to request, for a plurality of times, the VNFM to create the identifier of the first VNF. One VNFD needs to be requested once, and a plurality of VNFDs need to be requested for a plurality of times. When one VNF needs to be deployed, in the second aspect, the OSS/BSS directly requests the VNFM to create the identifier of the VNF, without sending the second request message via the NFVO. The following describes the two aspects in detail.

In the first aspect, before the VNFM receives the first request message, the method further includes:
   receiving, by the VNFM, the second request message sent by the network functions virtualisation orchestrator NFVO, where the second request message is used to request to create the identifier of the first VNF;
   creating, by the VNFM, the identifier of the first VNF based on the second request message; and
   sending, by the VNFM, the identifier of the first VNF to the NFVO.

That the VNFM receives the first request message includes: receiving, by the VNFM, the first request message sent by the NFVO. The first request message may also be referred to as an instantiation request message. In other words, in this manner, the first request message received by the VNFM is from the NFVO.

In the second aspect, before the VNFM receives the first request message, the method further includes: receiving, by the VNFM, the second request message sent by the operations support system and business support system OSS/BSS, where the second request message is used to request to create the identifier of the first VNF;
   creating, by the VNFM, the identifier of the first VNF based on the second request message; and
   sending, by the VNFM, the identifier of the first VNF to the OSS/BSS.

That the VNFM receives the first request message includes: receiving, by the VNFM, the first request message sent by the OSS/BSS through an equipment management system EMS. The first request message may also be referred to as an instantiation request message. In other words, in this manner, the first request message received by the VNFM is from the OSS/BSS.

It should be understood that in this embodiment of this application, when one VNF needs to be deployed, the steps in the foregoing method are performed once; and when a plurality of VNFs need to be deployed, the steps in the foregoing method need to be performed for a plurality of times. When one NS needs to be deployed, and the NS includes a plurality of VNFDs, the steps in the foregoing method need to be performed for a plurality of times to implement NS deployment.

Therefore, according to the method for deploying a VNF provided in this embodiment of this application, the value that is of the deployment parameter corresponding to the value of the flavour parameter of the first VNF and that is carried in the first request message may be input into the target file based on the first association relationship in the VNFD and the mapping relationship between the primary file and the target file. Then, the VNF can be deployed. In this way, the programmer does not need to determine the deployment parameter that is of the secondary file and that is corresponding to the value of the flavour parameter of the first VNF. This reduces participation of the programmer, improves automation, and helps improve system performance.

The foregoing describes the method for deploying a VNF by the VNFM. The following describes a method for deploying a VNF by the OSS/BSS and the NFVO with reference to the accompanying drawings.

FIG. 4 shows a method 400 for deploying a VNF by an OSS/BSS according to an embodiment of this application. The method includes the following steps.

S410: The operations support system and business support system OSS/BSS sends a fourth request message to a network functions virtualisation orchestrator NFVO. The NFVO receives the fourth request message sent by the OSS/BSS, where the fourth request message includes an identifier of a first VNFD of a first VNF and a value of a flavour parameter of the first VNF.

S420: The NFVO determines the first VNFD based on the identifier of the first VNFD.

S430: The NFVO determines, from the first VNFD and based on the value of the flavour parameter of the first VNF, a deployment parameter corresponding to the value of the flavour parameter of the first VNF.

In an optional embodiment, the first VNFD includes a primary file and one or more secondary files. The primary file includes a deployment parameter of each secondary file and a first association relationship. The first association relationship is used to indicate that a value of a flavour parameter of a VNF is associated with the deployment parameter of the secondary file. S430 includes: determining, by the NFVO, from the primary file and based on the value of the flavour parameter of the first VNF and the first association relationship, the deployment parameter corresponding to the value of the flavour parameter of the first VNF.

Because the primary file includes the deployment parameter of each secondary file, the NFVO may determine the deployment parameter corresponding to the value of the flavour parameter of the first VNF based on the value of the flavour parameter of the first VNF and the first association relationship.

For example, it is assumed that the primary file is VNFD.yaml in the method 300. When the NFVO receives the fourth request message that carries VNFD_id (the identifier of the first VNFD) and flavour 1 (the value of the flavour parameter of the first VNF). In this case, the NFVO determines the VNFD based on VNFD_id. The VNFD includes VNFD.yaml, VNF_DF1.yaml, and the VNF_DF2.yaml in the method 300. VNFD.yaml is the primary file, and VNF_DF1.yaml and VNF_DF2.yaml are secondary files. A secondary file corresponding to flavour 1 is VNF_DF1.yaml, and a secondary file corresponding to flavour 2 is VNF_DF2.yaml. When the NFVO learns, from the fourth request message, that the value of the flavour parameter of the first VNF is flavour 1, the NFVO associates flavour 1 with private_net_id: type: string private_net_cidr: type: string. It is indicated in VNFD.yaml, for example, indicated by type:concat:['inst_info_',get_input(flavour)] in VNFD.yaml, that flavour 1 is associated with deployment parameters in VNF_DF1.yaml. In this way, the NFVO can determine that the deployment parameter corresponding to the value of the flavour parameter of the first VNF is private_net_id: type: string private_net_cidr: type: string, and then sends private_net_id: type: string private_net_cidr: type: string to the OSS/BSS.

Optionally, there is a mapping relationship between the primary file and each of the one or more secondary files.

It should be noted that, for descriptions of the first VNFD in the method 400, refer to the descriptions in the method 300.

A plurality of VNFDs are stored in the NFVO or in a database that can be accessed by the NFVO. The NFVO may determine the first VNFD based on the identifier, in the fourth request message, of the first VNFD. For example, the identifier of the first VNFD may be an identifier (identifier, ID) of a template. The first VNFD includes one primary file and one or more secondary files, and a value of each flavour parameter corresponds to one secondary file. After determining the first VNFD, the NFVO may determine a target file from the one or more secondary files based on the value, in the fourth request message, of the flavour parameter of the first VNF; then use a deployment parameter in the target file as the deployment parameter corresponding to the value of the flavour parameter of the first VNF; and finally return the deployment parameter to the OSS/BSS.

Optionally, in this embodiment of this application, the VNFD and/or an NSD may be stored in the NFVO or in a database that can be accessed by the NFVO. To avoid repetition, a general description of obtaining the VNFD and/or the NSD from the NFVO is provided in this embodiment of this application. Specifically, whether the NFVO stores the VNFD and/or the NSD, or stores the VNFD and/or the NSD in the database that can be accessed by the NFVO is not limited in this embodiment of this application.

S440: The NFVO sends, to the OSS/BSS, the deployment parameter corresponding to the value of the flavour parameter of the first VNF, and the OSS/BSS receives the deployment parameter that is corresponding to the value of the flavour parameter of the first VNF and that is sent by the NFVO.

In an optional embodiment, after S410, the method further includes: sending, by the OSS/BSS, a second request message to a virtualised network function manager VNFM, where the second request message is used to request to create an identifier of the first VNF; receiving, by the OSS/BSS, the identifier of the first VNF sent by the VNFM based on the second request message; and sending, by the OSS/BSS, a first request message to the VNFM through an equipment management system EMS, where the first request message includes the identifier of the first VNF, the value of the flavour parameter of the first VNF, and a value of the deployment parameter corresponding to the value of the flavour parameter of the first VNF. For details, refer to the method 300.

Therefore, according to the method for deploying a VNF provided in this embodiment of this application, the NFVO may send, to the OSS/BSS, a deployment parameter corresponding to a determined value of a flavour parameter. Then, the OSS/BSS may add the deployment parameter to the first request message when sending the first request message. In this way, a programmer does not need to determine the deployment parameter corresponding to the value of the flavour parameter. This reduces interference of the programmer, improves automation, and helps improve system performance.

The foregoing description is as follows: When one VNF needs to be deployed, in the method 400, the OSS/BSS requests, from the NFVO based on the fourth request message, a deployment parameter for deploying the VNF. The following describes a case in which when one NS needs to be deployed, one or more VNFs need to be deployed for deploying the NS. The following describes a procedure of interaction between the OSS/BSS and the NFVO when an NS needs to be deployed.

In an optional embodiment, before S410, the OSS/BSS sends a fifth request message to the NFVO, and the NFVO receives the fifth request message sent by the OSS/BSS. The fifth request message includes an identifier of a network service and a value of a flavour parameter of the network service, the network service includes one or more VNFs, and the one or more VNFs include the first VNF. The NFVO determines the network service based on the identifier of the network service, where the network service includes a primary file and one or more secondary files. The NFVO determines, based on the value of the flavour parameter of the network service, a target file of the network service from the one or more secondary files included in the network service. The NFVO determines, from the target file of the network service, a value of a flavour parameter corresponding to each of the one or more VNFs. The NFVO sends the value of the flavour parameter corresponding to each VNF to the OSS/BSS.

Specifically, the NFVO stores a plurality of network services, or the database that can be accessed by the NFVO stores a plurality of network service templates. The NFVO needs to determine the network service based on the identifier that is of the network service and that is in the fifth request message. For example, the identifier of the network service may be an ID of the network service, and one identifier of the network service corresponds to one network service. A network service includes a primary file and one or more secondary files, each secondary file includes values of flavour parameters of one or more VNFs, and a value of a flavour parameter of one network service corresponds to one secondary file. The NFVO may determine one secondary file as the target file based on the value that is of the flavour parameter of the network service and that is in the fifth request message. The target file includes values of flavour parameters of one or more VNFs, or the like. The NFVO sends, to the OSS/BSS, a value of a flavour parameter corresponding to each VNF in the target file, for example, the value of the flavour parameter of the first VNF. In this way, the OSS/BSS may add the value of the flavour parameter of the first VNF to the fourth request message in S410.

For example, it is assumed that the network service determined by the NFVO based on the identifier that is of the network service and that is included in the fifth request message is described in the following. The NSD includes NSD.yaml (primary file), NS-DF1.yaml (secondary file), and NS_DF2.yaml (secondary file). A deployment file corresponding to the flavour parameter flavour 1 is NS-DF1.yaml, and a deployment file corresponding to the flavour parameter flavour 2 is NS_DF2.yaml.

NSD.yaml is described as follows:
tosca_definitions_version: tosca_simple_yaml_1_2
imports:
 - SOL001types
 - exampleVNF.yaml
 - NS_DF1.yaml
 - NS_DF2.yaml
topology_template:
 inputs:
  flavour:
   type: string
   required: true
   constraints: [flavour 1,flavour 2]
 node_templates:
  NS_1:
   type: tosca.nodes.nfv.exampleNS
   properties:
    flavour_id: get_input(flavour)
...
   requirements:
    -virtual_link
   interface:
NS-DF1.yaml is described as follows:
tosca_definitions_version:
tosca_simple_yaml_1_2
imports:
topology template:
 substitution mapping
  node_type: tosca.nodes.nfv.exampleNS
  properties:
   flavour_id: flavour 1
  requirements:
   -virtual_link: [VNF_1,virtual_link]
 node_templates:
  NS_1:
   type: tosca.nodes.nfv.exampleNS
   interface:
  VNF_1:
   type: tosca.nodes.nfv.exampleVNF
   properties:
    descriptor_id:1111-2222-3333-4444
    provider:
    flavour_id: flavour 1
    instantiation_level: level_1
  VNF_2:
   type: tosca.nodes.nfv.exampleVNF
   properties:
    descriptor_id: aaaa-bbbb-cccc-dddd
    provider:
    flavour_id: flavour 1
    instantiation_level: level_2
 VL_1:
NS_DF2.yaml is described as follows:
tosca_definitions_version:
tosca_simple_yaml_1_2
imports:
topology template:
 substitution mapping
  node_type: tosca.nodes.nfv.exampleNS
  properties:
   flavour_id: flavour 2
  requirements:
   -virtual_link: [VNF_1,virtual_link]
 node_templates:
  NS_1:
   type: tosca.nodes.nfv.exampleNS
   interface:
  VNF_1:
   type: tosca.nodes.nfv.exampleVNF
   properties:
    descriptor_id: 1111-2222-3333-4444
    provider:
    flavour_id: flavour 2
    instantiation_level: level_1
  VNF_2:
   type: tosca.nodes.nfv.exampleVNF
   properties:
    descriptor_id: aaaa-bbbb-cccc-dddd
    provider:
    flavour_id: flavour 1

-continued
```
        instantiation_level: level_2
    VNF_3:
        type: tosca.nodes.nfv.exampleVNF
        properties:
            descriptor_id: xxxx-yyyy-cccc-dddd
            provider:
            flavour_id: flavour 1
            instantiation_level: level_2
    VL_1:
```

Based on the foregoing description of the NSD, assuming that the value that is of the flavour parameter of the network service and that is in the fifth request message is flavour 1, the NFVO determines that the target file is NS_DF1.yaml, and a value of a flavour parameter of the VNF_1 included in NS_DF1.yaml is flavour 1. If a value of a flavour parameter of the VNF_2 is flavour 2, the NFVO sends VNF_1: flavour 1; VNF_2: flavour 1 to the OSS/BSS.

The foregoing describes only a case in which when the network service includes the first VNF, the OSS/BSS requests, from the NFVO based on the fourth request message, the deployment parameter corresponding to the value of the flavour parameter of the first VNF. When the network service further includes a second VNF, the following describes a case in which the OSS/BSS requests, from the NFVO based on a sixth request message, a deployment parameter corresponding to a value of a flavour parameter of the second VNF.

The OSS/BSS sends the sixth request message to the NFVO, and the NFVO receives the sixth request message sent by the OSS/BSS, where the sixth request message includes an identifier of the second VNFD and the value of the flavour parameter of the second VNF.

The NFVO determines a template of the second VNF based on the identifier of the second VNFD.

The second VNFD includes a primary file and one or more secondary files, the primary file includes a deployment parameter of each secondary file and a second association relationship, and the second association relationship is used to indicate that a value of a flavour parameter of a VNF is associated with the deployment parameter of the secondary file.

The NFVO determines, from the primary file of the second VNFD and based on the value of the flavour parameter of the second VNF and the second association relationship, the deployment parameter corresponding to the value of the flavour parameter of the second VNF.

The NFVO sends the deployment parameter corresponding to the value of the flavour parameter of the second VNF to the OSS/BSS, and the OSS/BSS receives the deployment parameter that is corresponding to the value of the flavour parameter of the second VNF and that is sent by the NFVO.

In an optional embodiment, when the OSS/BSS obtains the deployment parameter corresponding to the value of the flavour parameter of the first VNF and the deployment parameter corresponding to the value of the flavour parameter of the second VNF, the OSS/BSS sends a seventh request message to the NFVO, and the NFVO receives the seventh request message sent by the OSS/BSS. The seventh request message includes the value of the flavour parameter of the network service, the value of the deployment parameter corresponding to the value of the flavour parameter of the first VNF, and the value of the deployment parameter corresponding to the value of the flavour parameter of the second VNF. It should be noted that the value of the flavour parameter of the network service, the value of the deployment parameter corresponding to the value of the flavour parameter of the first VNF, and the value of the deployment parameter corresponding to the value of the flavour parameter of the second VNF may be determined based on a current deployment requirement.

In an optional embodiment, after the NFVO receives the seventh request message sent by the OSS/BSS, the method further includes: sending, by the NFVO, a second request message to the VNFM, where the second request message is used to request an identifier of the first VNF; receiving, by the NFVO, the identifier of the first VNF that is sent by the VNFM based on the second request message; and sending, by the NFVO, a first request message to the VNFN, where the first request message includes the identifier of the first VNF, the value of the flavour parameter of the first VNF, and the value of the deployment parameter corresponding to the value of the flavour parameter of the first VNF. For specific descriptions, refer to the descriptions of the method 300.

It should be understood that the VNFD includes a primary file and one or more secondary files. The network service also includes a primary file and one or more secondary files. In addition, the primary file of the VNF is different from the primary file of the network service, and the secondary file of the VNF is also different from the secondary file of the network service. To deploy a network service, one or more VNFs need to be deployed. In this embodiment of this application, in descriptions of the network service, the primary file is the primary file of the network service, and the secondary file is the secondary file of the network service. In descriptions of the VNFD, the primary file is the primary file of the VNFD, and the secondary file is the secondary file of the VNFD.

It should be noted that, in this embodiment of this application, the value that is of the flavour parameter of the network service and that is in the fifth request message may be determined based on a current deployment requirement, and the value of the deployment parameter corresponding to the value of the flavour parameter of the first VNF in the first request message may also be determined based on the current deployment requirement. The value of the flavour parameter of the network service, the value of the deployment parameter corresponding to the value of the flavour parameter of the first VNF, and the value of the deployment parameter corresponding to the value of the flavour parameter of the second VNF that are included in the seventh request message may also be determined based on the current deployment requirement.

Figure 5A:
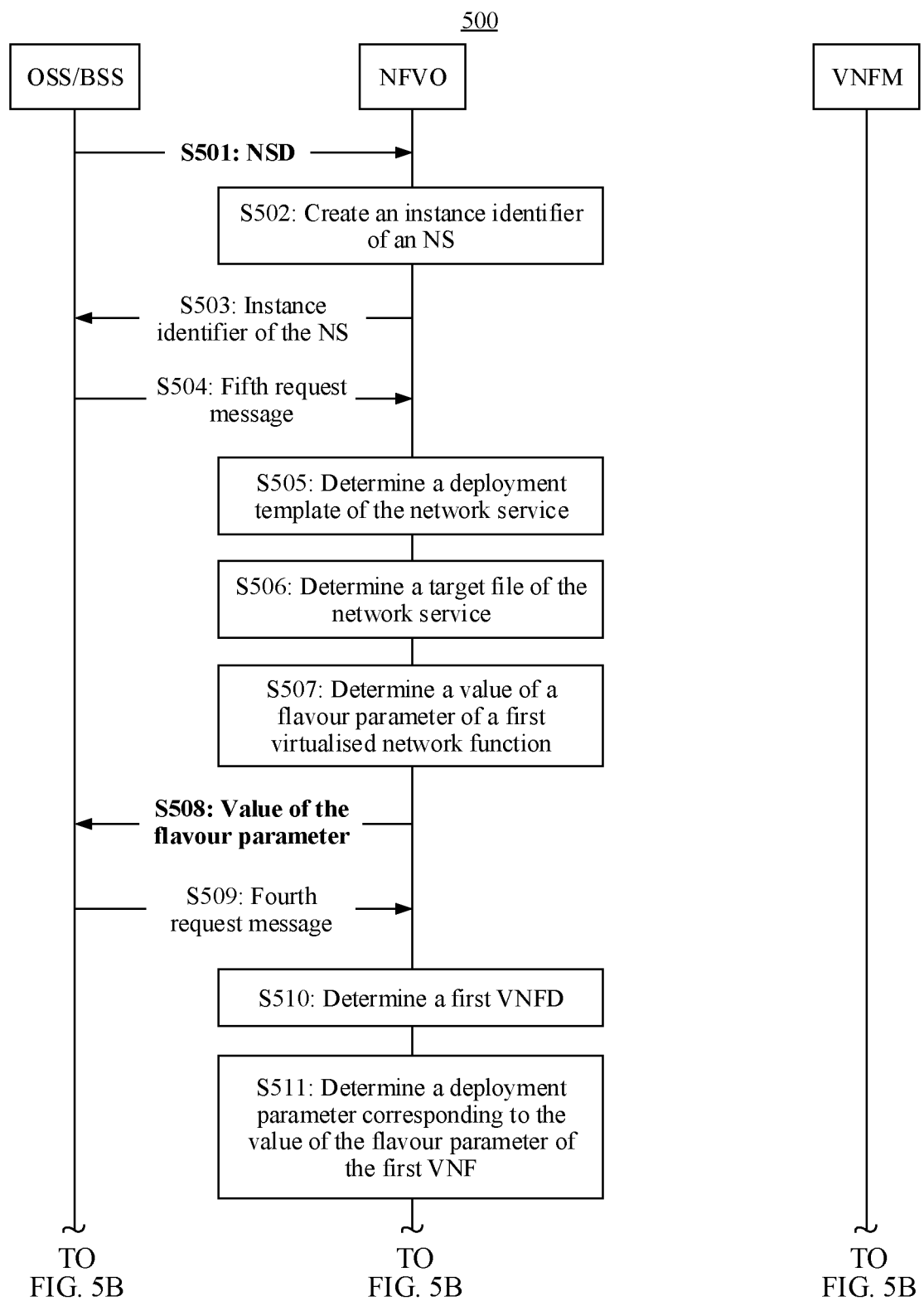
FIG. 5A and FIG. 5B are a schematic flowchart of still another method for deploying a virtualised network function according to an embodiment of this application.
Figure 5B:
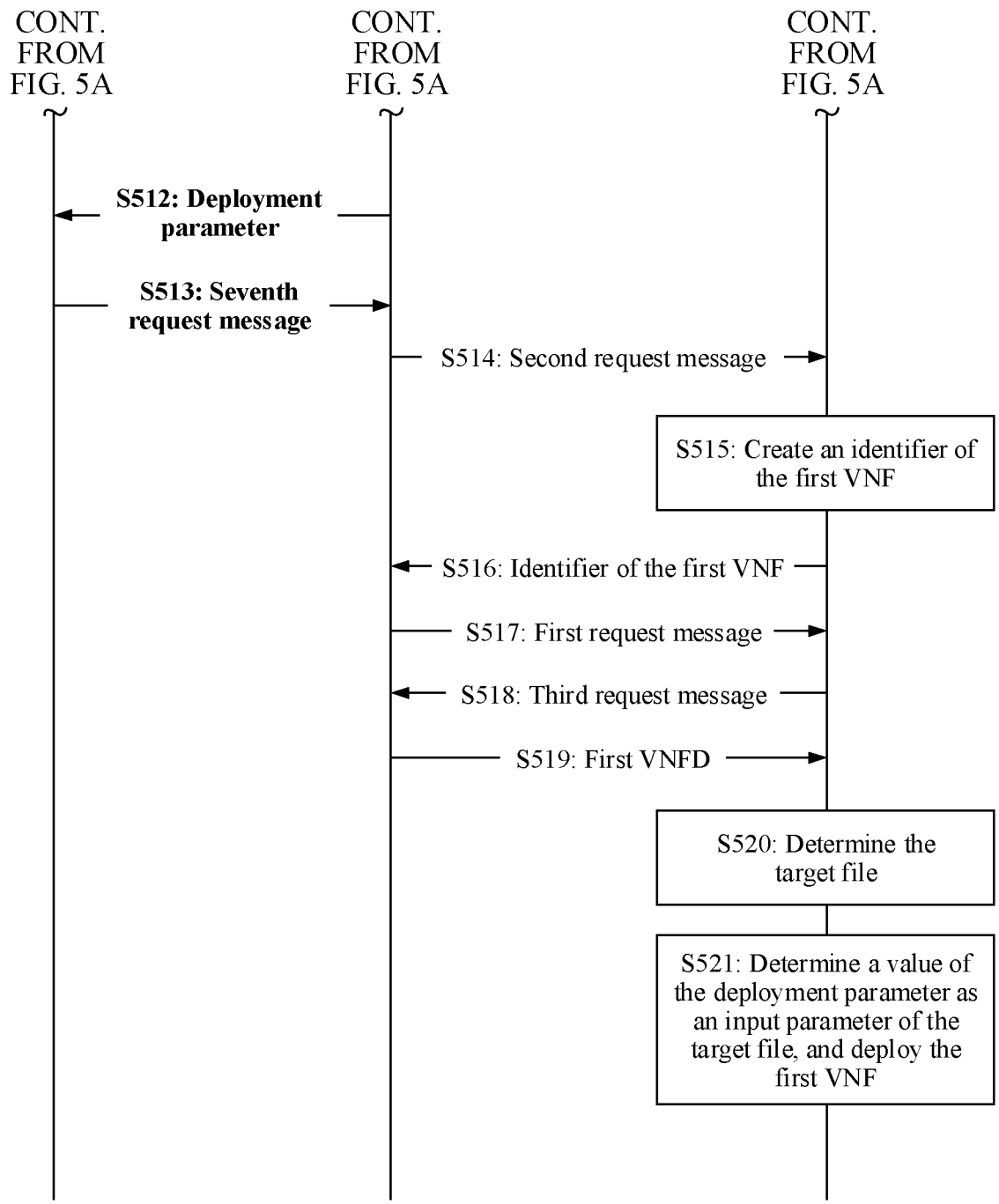

The following describes a method 500 for deploying a VNF in an embodiment of this application with reference to FIG. 5A and FIG. 5B. The method 500 includes the following steps.

S501 to S503: Same as S210 to S230.

S504: An OSS/BSS sends a fifth request message to an NFVO, where the fifth request message includes an identifier of a network service (NS ID) and a value of a flavour parameter of the network service (for example, NS flavour 1).

S505: The NFVO determines the network service based on the identifier that is of the network service and that is in the fifth request message.

In other words, the identifier of the network service is in a one-to-one correspondence with the network service. The NFVO may determine, based on the identifier of the network service, the network service from a file stored in the NFVO or in a database that can be accessed by the NFVO.

S506: The NFVO determines, based on the flavour parameter of the network service, a target file from one or more secondary files that are included in the network service. The network service includes a primary file and one or more secondary files.

For example, the network service may include NSD.yaml, NS-DF1.yaml, and NS_DF2.yaml in the foregoing method 400. NSD.yaml is the primary file of the network service, NS-DF1.yaml and NS_DF2.yaml are two secondary files of the network service. A deployment file corresponding to a flavour parameter flavour 1 is NS-DF1.yaml, and a deployment file corresponding to a flavour parameter flavour 2 is NS_DF2.yaml. It is assumed that the foregoing value of the flavour parameter of the network service is flavour 1. In this case, the NFVO may determine that the target file is NS-DF1.yaml.

S507: The NFVO determines a value of a flavour parameter of each VNF in the target file.

For example, according to the example in S506, the target file includes two VNFs: a VNF_1 and a VNF_2. A value of a flavour parameter of the VNF_1 is flavour 1, and a value of a flavour parameter of the VNF_2 is flavour 1.

S508: The NFVO sends the value of the flavour parameter of each VNF to the OSS/BSS.

For example, according to the examples in S506 and S507, the NFVO returns VNF_1: flavour 1, VNF_2: flavour 1 to the OSS/BSS.

S509: The OSS/BSS sends a fourth request message to the NFVO, where the fourth request message includes an identifier of a first VNFD and a value of a flavour parameter of a first VNF.

For example, according to the example in S506 to S508, the fourth request message may carry VNFD_id (the identifier of the first VNFD) and the flavour 1 (the value of the flavour parameter of the first VNF) that are corresponding to the VNF_1.

S510: The NFVO determines the first VNFD based on the identifier of the first VNFD. In other words, the NFVO determines the first VNFD based on a VNFD stored in the NFVO or a VNFD stored in the database that can be accessed by the NFVO.

Each VNFD includes a primary file and one or more secondary files. The primary file includes a deployment parameter of each secondary file and a first association relationship. The first association relationship is used to indicate that a value of a flavour parameter of a VNF is associated with the deployment parameter of the secondary file.

S511: The NFVO determines, from the primary file and based on the value of the flavour parameter of the first VNF and the first association relationship, a deployment parameter corresponding to the value of the flavour parameter of the first VNF.

For example, according to the examples in S506 to S509, the NFVO determines a VNFD corresponding to VNFD_id. For example, the primary file of the VNFD is VNFD.yaml in the method 300. In this case, the NFVO associates flavour 1 and private_net_id:type:string private_net_cidr: type:string based on flavour 1 and the first association relationship. The first association relationship is defined in VNFD.yaml, and indicates that flavour 1 is associated with a deployment parameter of VNF_DF1.yaml. For example, the first association relationship is type:concat:['inst_info_',get_input (flavour)] (the first association relationship) in VNFD.yaml. In this way, the NFVO may determine that the deployment parameter corresponding to the value of the flavour parameter of the first VNF is private_net_id: type: string private_net_cidr: type:string.

S512: The NFVO sends, to the OSS/BSS, the deployment parameter corresponding to the value of the flavour parameter of the first VNF.

It should be noted that S509 to S511 need to be performed once for one VNF, and S509 to S511 may be performed for a plurality of times for a plurality of VNFs. For example, for VNF_1: flavour 1 and VNF_2: flavour 1, S509 to S511 need to be performed twice.

S513: The OSS/BSS sends a seventh request message to the NFVO, and the NFVO receives the seventh request message sent by the OSS/BSS, where the seventh request message includes the value of the flavour parameter of the network service and a value of a deployment parameter corresponding to the value of the flavour parameter of each VNF. For example, the seventh request message includes the value of the flavour parameter of the network service, a value of the deployment parameter corresponding to the value of the flavour parameter of the first VNF, and a value of a deployment parameter corresponding to a value of a flavour parameter of a second VNF. If the network service includes a plurality of VNFs, the seventh request message includes a value of a deployment parameter corresponding to a value of a flavour parameter of each of the plurality of VNFs. The following uses only one VNF as an example for description.

For example, according to the examples in S506 to S512, the seventh request message includes: NS flavour 1, and values of deployment parameters for VNF_1: flavour 1: private_net_id: net1234567 and private_net_cidr: 192.168.0.0/24.

S514: The NFVO sends a second request message to the VNFM, and the VNFM receives the second request message sent by the NFVO, where the second request message is used to request to create an identifier of the first VNF.

S515: The VNFM creates the identifier of the first VNF based on the second request message.

For example, the second request message includes the identifier of the first VNFD. In this way, the VNFM creates the identifier of the first VNF based on the identifier of the first VNFD. For example, the identifier of the first VNF may be referred to as an instance identifier of the VNF.

According to the foregoing example, for example, the identifier of the first VNF is VNF1_id.

S516: The VNFM sends the identifier of the first VNF to the NFVO.

S517: The NFVO sends a first request message to the VNFM, where the first request message includes the identifier of the first VNF, the value of the flavour parameter of the first VNF, and the value of the deployment parameter corresponding to the value of the flavour parameter of the first VNF.

For example, according to the example in S506 to S513, the first request message includes: VNF1_id, flavour 1, and the values of the deployment parameters corresponding to flavour 1: private_net_id: net1234567, and private_net_cidr: 192.168.0.0/24.

It should be noted that in S517, a programmer may assign, based on a requirement of a current demander, values as the value of the flavour parameter of the first VNF and the value of the deployment parameter corresponding to the value of the flavour parameter of the first VNF.

S518: The VNFM sends a third request message to the NFVO, where the third request message includes the identifier of the first VNF, and the third request message is used to request the first VNFD from the NFVO. The first VNFD includes a primary file and one or more secondary files, there is a mapping relationship between the primary file and each of the one or more secondary files, the primary file includes a deployment parameter of each secondary file and a first association relationship, and the first association relationship is used to indicate that a value of a flavour parameter of a VNF is associated with the deployment parameter of the secondary file.

S519: The NFVO returns the first VNFD to the VNFM.

S520: The VNFM determines a target file from the one or more secondary files based on the value of the flavour parameter of the first VNF.

For example, according to the examples in S506 to S517, the primary file of the first VNF is VNFD.yaml in the method 300. The secondary files are VNF_DF1.yaml and VNF_DF2.yaml in the method 300. A secondary file corresponding to flavour 1 is VNF_DF1.yaml, and a secondary file corresponding to flavour 2 is VNF_DF2.yaml. In this case, the VNFM determines, based on flavour 1, that the target file is VNF_DF1.yaml.

S521: The VNFM determines, based on the first association relationship and the value of the flavour parameter of the first VNF, a deployment parameter of the target file from the deployment parameter of each secondary file included in the primary file. The VNFM determines the value of the deployment parameter corresponding to the value of the flavour parameter of the first VNF as a value of the deployment parameter of the target file. The VNFM inputs the value of the deployment parameter of the target file into the target file based on a mapping relationship between the primary file and the target file, and deploys the first VNF based on the value of the deployment parameter of the target file.

For example, according to the examples in S506 to S520, the first association relationship is type: concat:['inst_info_', get_input(flavour)] (the first association relationship), and the flavour 1 is associated with private_net_id: type: string private_net_cidr: type: string based on the first association relationship. In this way, the VNFM may determine that the deployment parameter corresponding to the value of the flavour parameter of the first VNF is private_net_id: type: string private_net_cidr: type: string. In this case, private_net_id: net1234567 and private_net_cidr: 192.168.0.0/24 in the first request message are values of private_net_id and string private_net_cidr. The VNFM successfully inputs private_net_id: net1234567 and private_net_cidr: 192.168.0.0/24 to VNF_DF1.yaml based on the mapping relationship, for example, instantiate_input: get_input(additional_parameters), between the primary file and the target file. The VNFM uses VNF_DF1.yaml to deploy the VNF_1.

If one network service includes a plurality of VNFs in S513, S514 to S521 are performed once for one VNF, and S514 to S521 need to perform for a plurality of times for a plurality of VNFs. After S514 to S521 are performed for a plurality of times, one network service is deployed.

Figure 6:
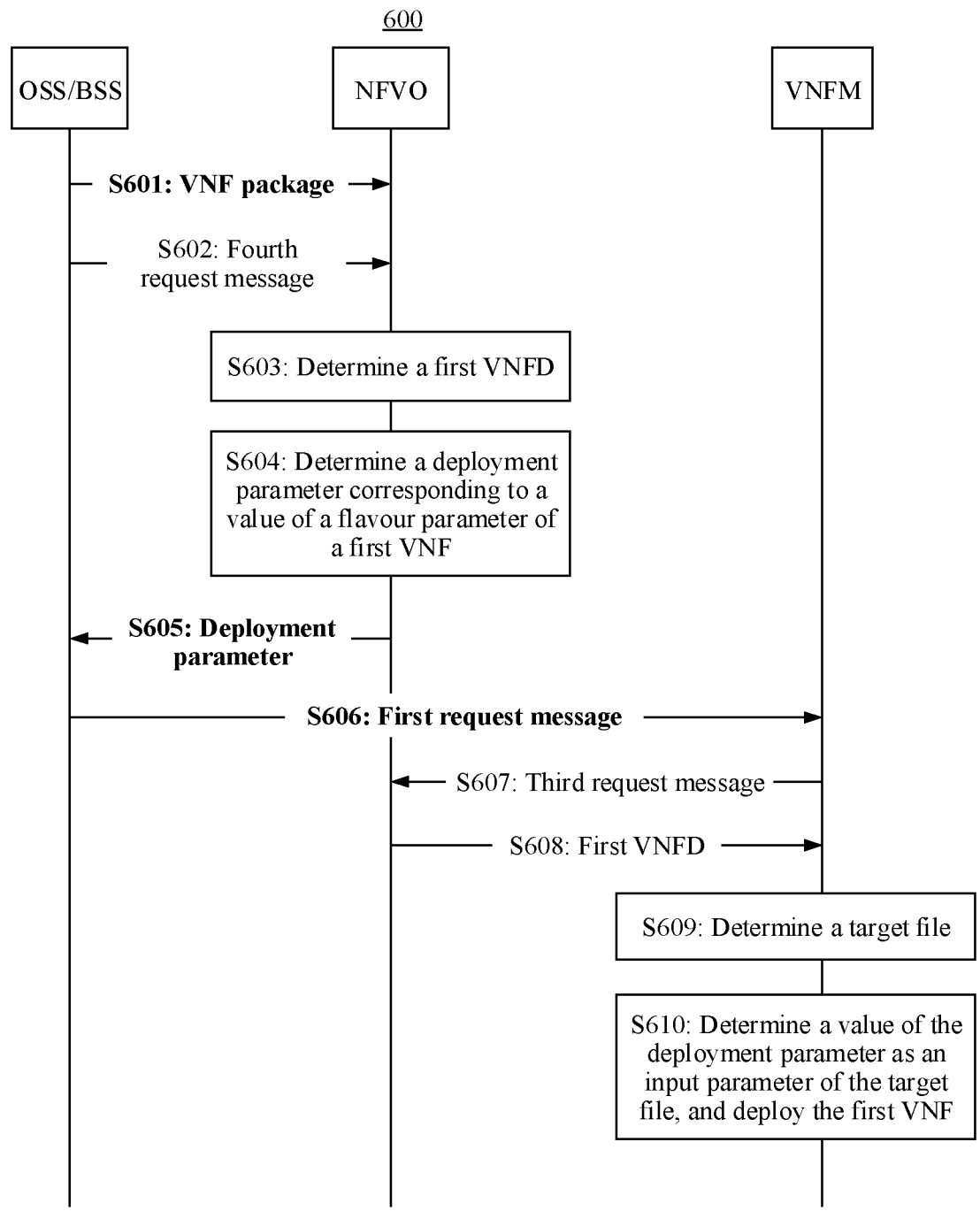
FIG. 6 is a schematic flowchart of yet another method for deploying a virtualised network function according to an embodiment of this application.

The following describes a method 600 for deploying a VNF in an embodiment of this application with reference to FIG. 6. A difference between the method 500 and the method 600 lies in the following: The method 500 is a process of deploying a network service, where the network service includes one or more VNFs, and the one or more VNFs need to be deployed during deployment of one network service. The method 600 is a process of deploying only one VNF. In the method 600, an example, in the method 500, in which a first VNF is a VNF 1 is used for description. The method 600 specifically includes the following steps.

S601: An OSS/BSS uploads a VNF package (VNF package) to an NFVO, where the VNF package includes a VNFD, and the OSS/BSS stores the VNFD in the NFVO or a database that can be accessed by the NFVO.

S602: Same as S509.
S603: Same as S510.
S604: Same as S511.
S605: Same as S512.

S606: The OSS/BSS sends a first request message to a VNFM, where the first request message includes an identifier of the first VNF, a value of a flavour parameter of the first VNF, and a value of a deployment parameter corresponding to the value of the flavour parameter of the first VNF.

For example, according to the example in S506 to S513, the first request message includes: VNF1_id, flavour 1, and values of deployment parameters corresponding to flavour 1: private_net_id: net1234567, and private_net_cidr: 192.168.0.0/24.

It should be noted that in S517, a programmer may assign, based on a requirement of a current demander, values as the value of the flavour parameter of the first VNF and the value of the deployment parameter corresponding to the value of the flavour parameter of the first VNF.

S607: Same as S518.
S608: Same as S519.
S609: Same as S520.
S610: Same as S521.

With reference to FIG. 1 to FIG. 6, the foregoing describes in detail the method for deploying a VNF provided in the embodiments of this application. With reference to FIG. 7 to FIG. 10, the following describes in detail apparatuses for deploying a VNF provided in the embodiments of this application.

Figure 7:
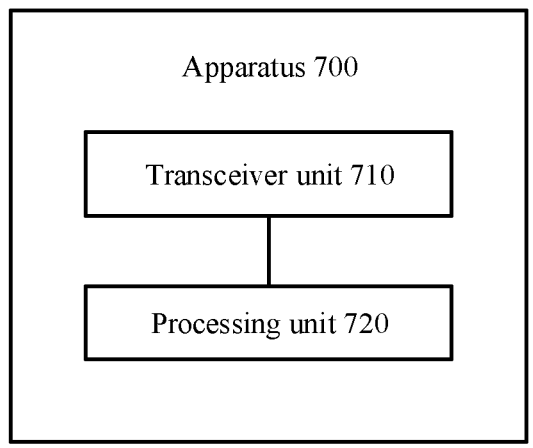
FIG. 7 is a schematic block diagram of an apparatus for deploying a virtualised network function according to an embodiment of this application.

FIG. 7 is a schematic block diagram of an apparatus 700 for deploying a VNF according to an embodiment of this application. The apparatus 700 may correspond to the virtualised network function manager described in the method 300, or may correspond to a chip or a component of the virtualised network function manager. In addition, modules or units in the apparatus 700 may be configured to perform actions or processing processes performed by the virtualised network function manager in the method 300. As shown in FIG. 7, the apparatus 700 for deploying a VNF may include a transceiver unit 710 and a processing unit 720.

The transceiver unit 710 is configured to obtain a first VNFD of a first VNF, where the first VNFD includes a primary file and one or more secondary files, there is a mapping relationship between the primary file and each of the one or more secondary files, the primary file includes a deployment parameter of each secondary file and a first association relationship, and the first association relationship is used to indicate that a value of a flavour parameter of a VNF is associated with the deployment parameter of the secondary file.

The processing unit 720 is configured to deploy the first VNF based on the first VNFD.

In an optional embodiment, the transceiver unit 710 is specifically configured to: receive a first request message, where the first request message includes an identifier of the first VNF, a value of a flavour parameter of the first VNF, and a value of a deployment parameter corresponding to the value of the flavour parameter of the first VNF.

The processing unit 720 is further configured to determine the first VNFD based on the identifier of the first VNF.

The processing unit 720 is specifically configured to: determine a target file from the one or more secondary files based on the value of the flavour parameter of the first VNF;

and deploy the first VNF based on the first association relationship and a mapping relationship between the primary file and the target file.

In an optional embodiment, the processing unit 720 is specifically configured to: determine, based on the first association relationship and the value of the flavour parameter of the first VNF, a deployment parameter of the target file from the deployment parameter of each secondary file included in the primary file; determine the value of the deployment parameter corresponding to the value of the flavour parameter of the first VNF as a value of the deployment parameter of the target file; and input the value of the deployment parameter of the target file into the target file based on the mapping relationship between the primary file and the target file, and deploy the first VNF based on the value of the deployment parameter of the target file.

In an optional embodiment, the transceiver unit 710 is further configured to:

before receiving the first request message, receive a second request message sent by a network functions virtualisation orchestrator NFVO, where the second request message is used to request to create the identifier of the first VNF.

The processing unit 720 is further configured to create the identifier of the first VNF based on the second request message.

The transceiver unit 710 is further configured to send the identifier of the first VNF to the NFVO.

The transceiver unit 720 is specifically configured to receive the first request message sent by the NFVO.

In an optional embodiment, the transceiver unit 710 is further configured to: before receiving the first request message, receive a second request message sent by an operations support system and business support system OSS/BSS, where the second request message is used to request to create the identifier of the first VNF.

The processing unit 720 is further configured to create the identifier of the first VNF based on the second request message.

The transceiver unit 710 is further configured to send the identifier of the first VNF to the OSS/BSS.

The transceiver unit 710 is specifically configured to receive the first request message sent by the OSS/BSS through an equipment management system EMS.

In an optional embodiment, the transceiver unit 710 is further configured to: before the first VNFD is determined based on the identifier of the first VNF, send a third request message to the NFVO, where the third request message includes the identifier of the first VNF, and the third request message is used to request the first VNFD from the NFVO.

The transceiver unit 710 is specifically configured to receive the first VNFD sent by the NFVO based on the third request message.

It should be understood that for a specific process of performing the foregoing corresponding steps by the units in the apparatus 700, refer to the foregoing descriptions of the method embodiment in FIG. 3. For brevity, details are not described herein again.

Figure 8:
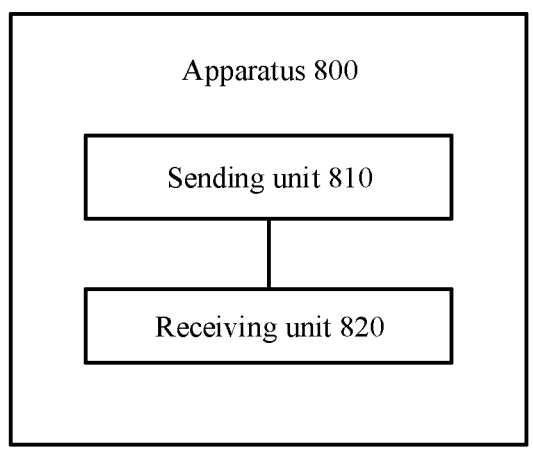
FIG. 8 is a schematic block diagram of another apparatus for deploying a virtualised network function according to an embodiment of this application.

FIG. 8 is a schematic block diagram of an apparatus 800 for deploying a VNF according to an embodiment of this application. The apparatus 800 may correspond to the operations support system and the business support system described in the method 400, or may correspond to a chip or a component of the operations support system and the business support system. In addition, modules or units in the apparatus 800 may be configured to perform actions or processing processes performed by the operations support system and business support system in the method 400. As shown in FIG. 8, the apparatus 800 for deploying a VNF may include a sending unit 810 and a receiving unit 820.

The sending unit 810 is configured to send a fourth request message to a network functions virtualisation orchestrator NFVO, where the fourth request message includes an identifier of a first VNFD of a first VNF and a value of a flavour parameter of the first VNF.

The receiving unit 820 is configured to receive a deployment parameter that is corresponding to the value of the flavour parameter of the first VNF and that is sent by the NFVO, where the deployment parameter corresponding to the value of the flavour parameter of the first VNF is determined based on the identifier of the first VNFD and the value of the flavour parameter of the first VNF.

In an optional embodiment, the sending unit 810 is further configured to: before sending the fourth request message to the network functions virtualisation orchestrator NFVO, send a fifth request message to the NFVO, where the fifth request message includes an identifier of a network service and a value of a flavour parameter of the network service, the network service includes one or more VNFs, and the one or more VNFs include the first VNF.

The receiving unit 820 is further configured to receive a value that is of a flavour parameter of each VNF and that is sent by the NFVO, where the value of the flavour parameter of each VNF is determined by the NFVO based on the identifier of the network service and the value of the flavour parameter of the network service.

In an optional embodiment, the sending unit 810 is further configured to send a sixth request message to the NFVO, where the sixth request message includes an identifier of a second VNFD and a value of a flavour parameter of the second VNF.

The receiving unit 820 is further configured to receive a deployment parameter that is corresponding to the value of the flavour parameter of the second VNF and that is sent by the NFVO, where the deployment parameter corresponding to the value of the flavour parameter of the second VNF is determined based on the identifier of the second VNFD and the value of the flavour parameter of the second VNF, and the one or more VNFs include the second VNF.

The sending unit 810 is further configured to send a seventh request message to the NFVO, where the seventh request message includes the value of the flavour parameter of the network service, a value of the deployment parameter corresponding to the value of the flavour parameter of the first VNF, and a value of the deployment parameter corresponding to the value of the flavour parameter of the second VNF.

In an optional embodiment, the sending unit 810 is further configured to:

after sending the fourth request message to the NFVO, send a second request message to a virtualised network function manager VNFM, where the second request message is used to request to create an identifier of the first VNF.

The receiving unit 820 is further configured to receive the identifier of the first VNF sent by the VNFM based on the second request message.

The sending unit 810 is further configured to send a first request message to the VNFM through an equipment management system EMS, where the first request message includes the identifier of the first VNF, the value of the flavour parameter of the first VNF, and the value of the deployment parameter corresponding to the value of the flavour parameter of the first VNF.

It should be understood that for a specific process of performing the foregoing corresponding steps by the units in the apparatus 800, refer to the foregoing descriptions of the method embodiment in FIG. 4. For brevity, details are not described herein again.

Figure 9:
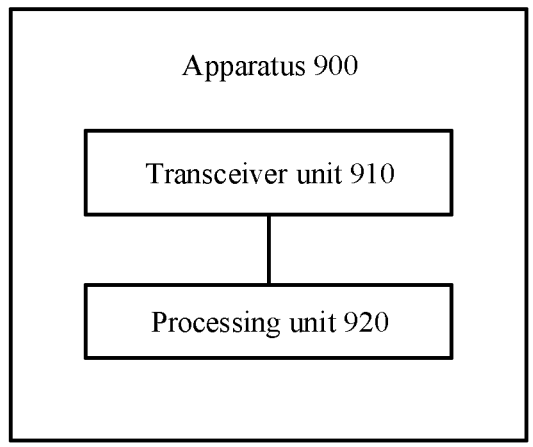
FIG. 9 is a schematic block diagram of still another apparatus for deploying a virtualised network function according to an embodiment of this application.

FIG. 9 is a schematic block diagram of an apparatus 900 for deploying a VNF according to an embodiment of this application. The apparatus 900 may correspond to the network functions virtualisation orchestrator described in the method 400, or may correspond to a chip or a component of the network functions virtualisation orchestrator. In addition, modules or units in the apparatus 900 may be configured to perform actions or processing processes performed by the network functions virtualisation orchestrator in the method 400. As shown in FIG. 9, the apparatus 900 for deploying a VNF may include a transceiver unit 910 and a processing unit 920.

The transceiver unit 910 is configured to receive a fourth request message sent by an operations support system and business support system OSS/BSS, where the fourth request message includes an identifier of a first VNFD of a first VNF and a value of a flavour parameter of the first VNF.

The processing unit 920 is configured to determine the first VNFD based on the identifier of the first VNFD.

The processing unit 920 is further configured to determine, from the first VNFD and based on the value of the flavour parameter of the first VNF, a deployment parameter corresponding to the value of the flavour parameter of the first VNF.

The transceiver unit 910 is further configured to send, to the OSS/BSS, the deployment parameter corresponding to the value of the flavour parameter of the first VNF.

It should be understood that for a specific process of performing the foregoing corresponding steps by the units in the apparatus 900, refer to the foregoing descriptions of the method embodiment in FIG. 4. For brevity, details are not described herein again.

The apparatus 700 in the foregoing solution has a function of implementing corresponding steps performed by the virtualised network function manager in the foregoing method, and the apparatus 800 in the foregoing solution has a function of implementing corresponding steps performed by the operations support system and business support system in the foregoing method, the apparatus 900 in the foregoing solution has a function of implementing corresponding steps performed by the network functions virtualisation orchestrator in the foregoing method. The function may be implemented by hardware, or may be implemented by hardware by executing corresponding software. The hardware or the software includes one or more modules corresponding to the foregoing function. For example, a sending unit may be replaced with a transmitter, a receiving unit may be replaced with a receiver, and another unit, for example, a determining unit, may be replaced with a processor, to respectively perform a sending operation, a receiving operation, and a related processing operation in the method embodiments.

In a specific implementation process, the processor may be configured to perform, for example but not limited to, baseband-related processing; and the transceiver may be configured to perform, for example but not limited to, radio frequency receiving and sending. The foregoing components may be separately disposed on chips independent of each other, or at least some components or all of the components are disposed on a same chip. For example, the processor may further be classified into an analog baseband processor and a digital baseband processor. The analog baseband processor and the transceiver may be integrated on a same chip, and the digital baseband processor may be disposed on an independent chip. With continuous development of integrated circuit technologies, more components can be integrated into a same chip. For example, the digital baseband processor and a plurality of application processors (for example but not limited to a graphics processing unit and a multimedia processor) may be integrated into a same chip. Such chip may be referred to as a system on chip (system on chip, SOC). Whether the components are independently disposed on different chips or are integrated and disposed on one or more chips usually depends on specific requirements of a product design. A specific implementation form of the foregoing components is not limited in the embodiments of this application.

Figure 10:
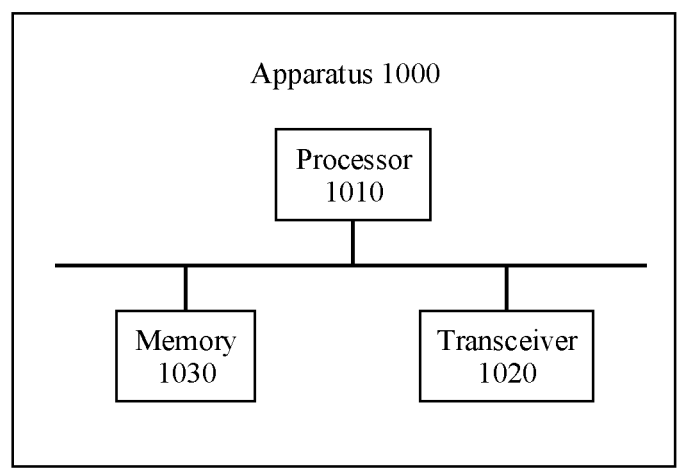
FIG. 10 is a schematic block diagram of yet another apparatus for deploying a virtualised network function according to an embodiment of this application.

It may be understood that the processor in the foregoing embodiments may separately implement, by executing a program instruction based on a hardware platform having a processor and a communications interface, functions of the processor in any design in the foregoing embodiments of this application. Based on this, as shown in FIG. 10, an embodiment of this application provides a schematic block diagram of an apparatus 1000 for deploying a VNF. The apparatus 1000 includes a processor 1010, a transceiver 1020, and a memory 1030. The processor 1010, the transceiver 1020, and the memory 1030 communicate with each other through an internal connection path. The memory 1030 is configured to store an instruction. The processor 1010 is configured to execute the instruction stored in the memory 1030, to control the transceiver 1020 to send a signal and/or receive a signal.

In a possible implementation, if the apparatus 1000 is a virtualised network function manager, the transceiver 1020 is configured to obtain a first VNFD of a first VNF. The first VNFD includes a primary file and one or more secondary files, there is a mapping relationship between the primary file and each of the one or more secondary files, the primary file includes a deployment parameter of each secondary file and a first association relationship, and the first association relationship is used to indicate that a value of a flavour parameter of a VNF is associated with the deployment parameter of the secondary file. The processor 1010 is configured to deploy the first VNF based on the first VNFD.

In another possible implementation, if the apparatus 1000 is an operations support system and business support system, the transceiver 1020 is configured to send a fourth request message to a network functions virtualisation orchestrator NFVO, where the fourth request message includes an identifier of the first VNFD of the first VNF and a value of a flavour parameter of the first VNF. The transceiver 1020 is further configured to receive a deployment parameter that is corresponding to the value of the flavour parameter of the first VNF and that is sent by the NFVO, where the deployment parameter corresponding to the value of the flavour parameter of the first VNF is determined based on the identifier of the first VNFD and the value of the flavour parameter of the first VNF.

In another possible implementation, if the apparatus 1000 is a network functions virtualisation orchestrator, the transceiver 1020 is configured to receive a fourth request message sent by an operations support system and business support system OSS/BSS, where the fourth request message includes an identifier of a first VNFD of a first VNF and a value of a flavour parameter of the first VNF. The processor 1010 is configured to determine the first VNFD based on the identifier of the first VNFD. The processor 1010 is further configured to determine, from the first VNFD and based on the value of the flavour parameter of the first VNF, a deployment parameter corresponding to the value of the flavour parameter of the first VNF. The transceiver 1020 is further configured to send, to the OSS/BSS, the deployment parameter corresponding to the value of the flavour parameter of the first VNF.

It should be understood that the apparatus in FIG. 7, the apparatus in FIG. 8, or the apparatus in FIG. 9 in the embodiments of this application may be implemented based on the apparatus 1000 in FIG. 10, and may be configured to perform steps and/or processes corresponding to the virtualised network function manager, the operations support system and business support system, and the network functions virtualisation orchestrator in the foregoing method embodiments.

It may be understood that the methods, the procedures, the operations, or the steps in the designs described in the embodiments of this application can be implemented in a one-to-one correspondence manner based on computer software, electronic hardware, or a combination of computer software and electronic hardware. Whether these functions are performed in a hardware manner or a software manner depends on specific application and a design constraint of the technical solutions. For example, in consideration of aspects such as good universality, low costs, and decoupling between software and hardware, these functions may be implemented by executing a program instruction. For another example, in consideration of aspects such as system performance and reliability, these functions may be implemented based on a private circuit. A person of ordinary skill in the art may implement the described functions based on different methods for each particular application. This is not limited herein.

According to the methods provided in the embodiments of this application, this application further provides a computer program product. The computer program product includes computer program code. When the computer program code is run on a computer, the computer is enabled to perform the methods in the foregoing embodiments. The embodiments in this application may also be combined with each other.

Based on the methods provided in the embodiments of this application, this application further provides a computer-readable medium. The computer-readable medium stores program code, and when the program code is run on a computer, the computer is enabled to perform the methods in the foregoing embodiments.

In the embodiments of this application, it should be noted that the foregoing method embodiments in the embodiments of this application may be applied to a processor, or may be implemented by a processor. The processor may be an integrated circuit chip and has a signal processing capability. In an implementation process, the steps in the foregoing method embodiments may be implemented based on a hardware integrated logic circuit in the processor, or based on instructions in a form of software. The foregoing processor may be a general purpose processor, a digital signal processor (digital signal processor, DSP), an application-specific integrated circuit (application-specific integrated circuit, ASIC), a field programmable gate array (Field programmable gate array, FPGA) or another programmable logic device, a discrete gate or transistor logic device, or a discrete hardware component. The processor may implement or perform the methods, steps, and logical block diagrams that are disclosed in the embodiments of this application. A general purpose processor may be a microprocessor, or the processor may be any conventional processor or the like. The steps in the methods disclosed with reference to the embodiments of this application may be directly performed and completed by a hardware decoding processor, or may be performed and completed by a combination of hardware in a decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory in the embodiments of this application may be a volatile memory or a non-volatile memory, or may include a volatile memory and a non-volatile memory. The non-volatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. There are a plurality of different types of RAMs, such as a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The terms "first", "second", and the like in this application are merely used to distinguish different objects, and "first" and "second" do not limit an actual sequence or functions of objects modified by "first" and "second". Any embodiment or design solution described as "example", "for example", "such as", "optionally", or "in some implementations" in this application should not be construed as being more advantageous than another embodiment or design. Specifically, the use of these words is intended to present related concepts in a specific manner.

Names may be assigned to various objects that may appear in this application, for example, various messages/information/devices/network elements/systems/apparatuses/operations. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

All or some of the foregoing embodiments may be implemented based on software, hardware, firmware, or any combination thereof. When being implemented based on software, all or some of the embodiments may be implemented in a form of a computer program product. The computer program product may include one or more computer instructions. When the computer program instructions are loaded and executed on a computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (solid-state disk, SSD)), or the like.

A person of ordinary skill in the art may be aware that, units and algorithm steps in examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement a described function for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual coupling or direct coupling or communication connection may be implemented based on some interfaces. The indirect coupling or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for deploying a virtualised network function (VNF), comprising:
   receiving, by a virtualised network function manager (VNFM), a first request message, wherein the first request message comprises an identifier of the VNF, a value of a flavour parameter of the VNF, and a value of a deployment parameter corresponding to the value of the flavour parameter of the VNF; and
   determining, by the VNFM, a first virtualised network function descriptor (VNFD) of the VNF based on the identifier of the VNF, wherein the first VNFD comprises a primary file and one or more secondary files each having a mapping relationship with the primary file, the primary file comprises a deployment parameter of each secondary file and a first association relationship indicating that a value of a flavour parameter of a VNF is associated with the deployment parameter of the secondary file; and
   determining, by the VNFM, a target file from the one or more secondary files based on the value of the flavour parameter of the VNF in the first request message; and
   deploying, by the VNFM, the VNF based on the first association relationship and a mapping relationship between the primary file and the target file the first VNFD.

2. The method according to claim 1, wherein the step of deploying the VNF based on the first association relationship and the mapping relationship between the primary file and the target file comprises:
   determining, based on the first association relationship and the value of the flavour parameter of the VNF, a deployment parameter of the target file from the deployment parameter of each secondary file comprised in the primary file;
   determining the value of the deployment parameter corresponding to the value of the flavour parameter of the VNF as a value of the deployment parameter of the target file; and
   inputting the value of the deployment parameter of the target file into the target file based on the mapping relationship between the primary file and the target file, and deploying the VNF based on the value of the deployment parameter of the target file.

3. The method according to claim 1, wherein before receiving the first request message, the method further comprises:
receiving a second request message sent by a network functions virtualisation orchestrator (NFVO), wherein the second request message requests creation of the identifier of the VNF;
creating the identifier of the VNF based on the second request message; and
sending the identifier of the VNF to the NFVO;
wherein the step of receiving the first request message receives the first request message from the NFVO.

4. The method according to claim 1, wherein before receiving the first request message, the method further comprises:
receiving a second request message sent by an operations support system and business support system OSS/BSS, wherein the second request message requests creation of the identifier of the VNF;
creating the identifier of the VNF based on the second request message; and
sending the identifier of the VNF to the OSS/BSS;
wherein the step of receiving the first request message receives the first request message sent by the OSS/BSS through an equipment management system (EMS).

5. The method according to claim 1, wherein before the step of determining the VNFD based on the identifier of the VNF, the method further comprises:
sending a third request message to the NFVO, wherein the third request message comprises the identifier of the VNF, and the third request message requests the VNFD from the NFVO; and
wherein the step of determining the VNFD based on the identifier of the first VNF comprises:
receiving the VNFD sent by the NFVO based on the third request message.

6. A method for deploying a virtualised network function (VNF), comprising:
receiving, by a network functions virtualisation orchestrator (NFVO), a request message sent by an operations support system and business support system (OSS/BSS), wherein the request message comprises an identifier of a network service and a value of a flavour parameter of the network service, the network service comprises one or more VNFs including a first VNF;
determining, by the NFVO, the network service based on the identifier of the network service, wherein the network service comprises a primary file and one or more secondary files;
determining, by the NFVO, based on the value of the flavour parameter of the network service, a target file of the network service from the one or more secondary files comprised in the network service;
determining, by the NFVO, from the target file of the network service, a value of a flavour parameter corresponding to each of the one or more VNFs;
sending, by the NFVO, the value of the flavour parameter corresponding to each VNF to the OSS/BSS;
receiving, by the NFVO, a request message sent by the OSS/BSS, wherein the request message comprises an identifier of a first virtualised network function descriptor (VNFD) of the first VNF and a value of a flavour parameter of the first VNF;
determining, by the NFVO, the first VNFD based on the identifier of the first VNFD;
determining, by the NFVO, from the first VNFD and based on the value of the flavour parameter of the first VNF, a deployment parameter corresponding to the value of the flavour parameter of the first VNF; and
sending, by the NFVO, to the OSS/BSS the deployment parameter corresponding to the value of the flavour parameter of the first VNF.

7. An apparatus deploying a virtualised network function (VNF), comprising:
a memory storing executable instructions;
a processor configured to execute the executable instructions to:
receive a first request message, wherein the first request message comprises an identifier of the VNF, a value of a flavour parameter of the VNF, and a value of a deployment parameter corresponding to the value of the flavour parameter of the VNF;
determine a first virtualised network function descriptor (VNFD) of the VNF based on the identifier of the VNF, wherein the first VNFD comprises a primary file and one or more secondary files each having a mapping relationship with the primary file, the primary file comprises a deployment parameter of each secondary file and a first association relationship, and the first association relationship is used to indicate that a value of a flavour parameter of a VNF is associated with the deployment parameter of the secondary file; and
determine a target file from the one or more secondary files based on the value of the flavour parameter of the VNF; and
deploy the VNF based on the first association relationship and a mapping relationship between the primary file and the target file.

8. The apparatus according to claim 7, wherein the processor is configured to:
determine, based on the first association relationship and the value of the flavour parameter of the VNF, a deployment parameter of the target file from the deployment parameter of each secondary file comprised in the primary file;
determine the value of the deployment parameter corresponding to the value of the flavour parameter of the VNF as a value of the deployment parameter of the target file; and
input the value of the deployment parameter of the target file into the target file based on the mapping relationship between the primary file and the target file, and deploy the VNF based on the value of the deployment parameter of the target file.

9. The apparatus according to claim 7, wherein processor is configured to:
before receiving the first request message, receive a second request message sent by a network functions virtualisation orchestrator (NFVO), wherein the second request message requests creation of the identifier of the VNF;
create the identifier of the VNF based on the second request message;
send the identifier of the VNF to the NFVO; and
receive the first request message sent by the NFVO.

10. The apparatus according to claim 7, wherein the processor is further configured to:
before receiving the first request message, receive a second request message sent by an operations support system and business support system (OSS/BSS), wherein the second request message is used to requests creation of the identifier of the VNF;

create the identifier of the VNF based on the second request message;

send the identifier of the VNF to the OSS/BSS; and receive the first request message sent by the OSS/BSS through an equipment management system EMS.

11. The apparatus according to claim 7, wherein the processor is further configured to:

before the VNFD is determined based on the identifier of the first virtualised network function, send a third request message to the NFVO, wherein the third request message comprises the identifier of the first virtualised network function, and the third request message is used to request the first virtualised network function from the NFVO; and receive the VNFD sent by the NFVO based on the third request message.

12. An apparatus deploying a network functions virtualisation orchestrator (NFVO), comprising:

a memory storing executable instructions;

a processor configured to execute the executable instructions to:

receive a request message sent by an operations support system and business support system (OSS/BSS), wherein the request message comprises an identifier of a network service and a value of a flavour parameter of the network service, the network service comprises one or more VNFs including a first VNF;

determine the network service based on the identifier of the network service, wherein the network service comprises a primary file and one or more secondary files;

determine based on the value of the flavour parameter of the network service, a target file of the network service from the one or more secondary files comprised in the network service;

determine from the target file of the network service, a value of a flavour parameter corresponding to each of the one or more VNFs; and send the value of the flavour parameter corresponding to each VNF to the OSS/BSS;

receive a request message sent by the OSS/BSS, wherein the request message comprises an identifier of a first virtualised network function descriptor (VNFD) of the first VNF and a value of a flavour parameter of the first VNF;

determine the first VNFD based on the identifier of the first VNFD;

determine from the first VNFD and based on the value of the flavour parameter of the first VNF, a deployment parameter corresponding to the value of the flavour parameter of the first VNF; and send to the OSS/BSS the deployment parameter corresponding to the value of the flavour parameter of the first VNF.

* * * * *